(12) United States Patent
Oh et al.

(10) Patent No.: US 11,364,428 B2
(45) Date of Patent: Jun. 21, 2022

(54) DEVICE FOR SENSING A MOVING BALL AND METHOD FOR COMPUTING PARAMETERS OF MOVING BALL USING THE SAME

(71) Applicant: GOLFZON CO., LTD., Daejeon (KR)

(72) Inventors: Sea Jung Oh, Daejeon (KR); Tae Suk Ko, Seoul (KR); Kang Yoon Lim, Daejeon (KR); Soo Ho Chang, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 267 days.

(21) Appl. No.: 16/771,669

(22) PCT Filed: Nov. 26, 2018

(86) PCT No.: PCT/KR2018/014651
§ 371 (c)(1),
(2) Date: Jun. 10, 2020

(87) PCT Pub. No.: WO2019/117503
PCT Pub. Date: Jun. 20, 2019

(65) Prior Publication Data
US 2021/0069569 A1    Mar. 11, 2021

(30) Foreign Application Priority Data

Dec. 12, 2017   (KR) ........................ 10-2017-0170564

(51) Int. Cl.
| | | |
|---|---|---|
| *A63B 69/36* | (2006.01) | |
| *G01S 13/42* | (2006.01) | |
| *G01S 13/58* | (2006.01) | |
| *G01S 13/88* | (2006.01) | |
| *A63B 24/00* | (2006.01) | |

(52) U.S. Cl.
CPC ...... *A63B 69/3658* (2013.01); *A63B 69/3605* (2020.08); *G01S 13/42* (2013.01);
(Continued)

(58) Field of Classification Search
CPC ............ A63B 69/3658; A63B 69/3605; A63B 2024/0034; A63B 2220/13;
(Continued)

(56) References Cited

U.S. PATENT DOCUMENTS 5,342,051 A * 8/1994 Rankin .............. A63B 24/0021
                                                         473/409
7,292,711 B2 * 11/2007 Kiraly ....................... G06T 7/70
                                                         348/169
(Continued)

FOREIGN PATENT DOCUMENTS

| | | | |
|---|---|---|---|
| JP | 2007-101294 A | 4/2007 | |
| JP | 2012-231908 A | 11/2012 | |

(Continued)

OTHER PUBLICATIONS

International Search Report for PCT/KR2018/014651 dated Mar. 21, 2019 from Korean Intellectual Property Office.

*Primary Examiner* — Allen Chan
(74) *Attorney, Agent, or Firm* — Revolution IP, PLLC

(57) ABSTRACT

The present invention is not a method of directly calculating the rotational characteristics of a ball through frequency analysis of a received signal as in the prior arts, but a method of determining a final spin information by finding the spin information of the moving ball while approaching a ball trajectory predicted in terms of the trajectory of a moving ball using the position coordinate data of the ball to the trend data indicating the trend of the position coordinates of the moving ball. The present invention provides a method of finding the spin in terms of the trajectory of the moving ball, regardless of whether it is possible to check the frequency characteristics of the rotation of the ball from the signal reflected from the moving ball, and thus derives a fairly accurate and uniform spin calculation result.

19 Claims, 16 Drawing Sheets

(52) U.S. Cl.
CPC .............. *G01S 13/58* (2013.01); *G01S 13/88* (2013.01); *A63B 2024/0034* (2013.01); *A63B 2220/13* (2013.01); *A63B 2220/30* (2013.01); *A63B 2220/89* (2013.01)

(58) Field of Classification Search
CPC . A63B 2220/30; A63B 2220/89; G01S 13/42; G01S 13/58; G01S 13/88
USPC .......................................... 342/107; 473/152
See application file for complete search history.

(56) References Cited

U.S. PATENT DOCUMENTS

| | | | |
|---|---|---|---|
| 8,409,024 B2 * | 4/2013 | Marty | A63B 24/0003 356/28 |
| 2002/0107078 A1 * | 8/2002 | Collins | A63B 24/0021 473/152 |
| 2007/0075891 A1 | 4/2007 | Sajima | |
| 2009/0075744 A1 | 3/2009 | Tuxen | |
| 2013/0304417 A1 * | 11/2013 | Mooney | A63B 69/3614 702/153 |
| 2014/0004969 A1 | 1/2014 | Jang et al. | |
| 2015/0350609 A1 * | 12/2015 | Kim | H04N 7/181 348/157 |
| 2015/0356748 A1 | 12/2015 | Kim | |
| 2016/0306035 A1 * | 10/2016 | Johnson | G01S 13/878 |

FOREIGN PATENT DOCUMENTS

| | | |
|---|---|---|
| JP | 2016-507283 A | 3/2016 |
| JP | 6048120 B2 | 12/2016 |
| KR | 10-0947898 B1 | 3/2010 |
| KR | 10-1048090 B1 | 7/2011 |
| KR | 10-2015-0139494 A | 12/2015 |
| KR | 10-2016-0054013 A | 5/2016 |

* cited by examiner (a)

(b)

(a)

(b)

DEVICE FOR SENSING A MOVING BALL AND METHOD FOR COMPUTING PARAMETERS OF MOVING BALL USING THE SAME

TECHNICAL FIELD

The present invention relates to a sensing device for a moving ball and a method for calculating motion parameters of the moving ball. More specifically, the signal reflected from the moving ball is analyzed using the Doppler effect of the radar signal and the sensing device is calculating the motion parameters of the ball using the analyzed information.

BACKGROUND ART

Attempts have always been made to apply ball-based sports, especially golf, to simulated golf, such as so-called screen golf, by accurately sensing the physical characteristics of the ball hit by the golfer and using the sensing information to perform analysis of the moving ball or video analysis.

In particular, since the spin of a ball hit and moving rotates at a very high spin rate around an axis in a three-dimensional space, it is quite difficult to measure it using a conventional camera sensor. Thus Research and development on radar sensors using the Doppler Effect of the radar signal in field of golf sports is underway for a device that can more accurately calculate the spin of the moving ball.

Spin calculation of a moving ball using a conventional radar sensor, for example, the spin calculation methods disclosed in Korean Patent Publication No. 10-0947898, etc., had a technology that receives a signal reflected from a rotating ball in flight and calculates a rotation of a moving ball depending on the frequency analysis of the received Doppler signal by analyzing frequencies of the received signal to identify spectrum traces and calculating a rotation speed and rotation frequency of the rotating ball using a frequency distance between the discontinuous spectrum traces.

The techniques disclosed in various prior arts such as Japanese Patent No. 6048120, Korean Patent Publication No. 2016-0054013 and Korean Patent Publication No. 2015-0139494 are different from one another with respect to specific manners of frequency analysis, however the methods of the above stated arts was to calculate the spin of the ball directly depending on the analysis of the received signal.

Calculating the spin of the ball according to the prior art as described above, the point and frequency that the reception of the reflected signal and the frequency of the rotation of the ball in the received signal must be accurately received so that the frequency analysis can always be done accurately It should be assumed that the results according to the analysis, etc., must be somewhat consistent.

However, in practice, there is a problem that depending on the surrounding situation, the type of the golf ball, the surface condition of the golf ball, for example, when there is foreign matter on the golf ball, the frequency characteristic indicating the rotation of the ball is difficult to obtain from the received signal or always produce uniform results.

Prior arts related to the conventional techniques are KR10-0947898, JP6048120, KR2016-0054013, and KR2015-0139494.

DISCLOSURE

Technical Problem

The present invention is not a method of directly calculating the rotational characteristics of a ball through frequency analysis of a received signal as in the prior arts, but a method of determining a final spin information by finding the spin information of the moving ball while approaching a ball trajectory predicted in terms of the trajectory of a moving ball using the position coordinate data of the ball to the trend data indicating the trend of the position coordinates of the moving ball. The present invention provides a method of finding the spin in terms of the trajectory of the moving ball, regardless of whether it is possible to check the frequency characteristics of the rotation of the ball from the signal reflected from the moving ball, and thus derives a fairly accurate and uniform spin calculation result.

Technical Solution

In accordance with an aspect of the present invention, the above and other objects can be accomplished by the provision of a method for calculating motion parameters of the moving ball by transmitting radar signals and receiving and analyzing reflected signals reflected from the moving ball, wherein the method comprises analyzing the received reflected signals and calculating position coordinates data of the moving ball at predetermined time intervals, calculating initial motion conditions of the ball using the calculated position coordinates data of the ball, generating predicted ball trajectories according to trial spin information under the initial motion conditions of the calculated ball, determining a trajectory that best matches the trajectory according to data calculated as a trend of the calculated position coordinates of the ball among the predicted ball trajectories, and determining a trial spin information applied to the determined trajectory as a final spin information.

In accordance with another aspect of the present invention, there is provided a method for calculating motion parameters of the moving ball by transmitting radar signals and receiving and analyzing reflected signals reflected from the moving ball, wherein the method comprises analyzing the received reflected signals and calculating position coordinates data of the moving ball at predetermined time intervals, calculating trend data representing a trend for the position coordinates of the ball based on an analysis of low-pass filtering signals for the received reflected signals and an analysis of a moving average for the position coordinates of the ball, calculating initial motion conditions of the ball using at least one of the calculated position coordinates data of the ball and the trend data, and repeatedly applying a trial spin information to a predicted ball trajectory until the predicted ball trajectory according to a trial spin information closes to a trajectory according to the trend data within the smallest error range, and determining the trial spin information finally applied as the final spin information.

In accordance with another aspect of the present invention, there is provided a sensing device for a moving ball, wherein the sensing device comprises a signal transmitter configured to transmit radar signal, a signal receiver configured to receive reflected signals reflected from the moving ball, a signal analyzer configured to analyze the received reflected signals and calculating position coordinates data of the moving ball at predetermined time intervals, and an information calculator configured to calculate an initial motion conditions of the moving ball using the calculated position coordinates data of the ball, generate predicted ball trajectories according to various values of trial spin information under the calculated initial motion conditions of the moving ball, determine a trajectory that best matches the trajectory according to data calculated as a trend of the calculated position coordinates of the ball among the predicted ball trajectories, and determine a trial spin information applied to the determined trajectory as a final spin information.

Advantageous Effects

The present invention provides a method of finding the spin in terms of the trajectory of the moving ball, regardless of whether it is possible to check the frequency characteristics of the rotation of the ball from the signal reflected from the moving ball, and thus derives a fairly accurate and uniform spin calculation result, since a final spin information can be determined by finding the spin information of the moving ball while approaching a ball trajectory predicted in terms of the trajectory of a moving ball using the position coordinate data of the ball to the trend data indicating the trend of the position coordinates of the moving ball.

BEST MODE

A detailed description of a sensing device for a moving ball and a method for calculating motion parameters for the moving ball using the sensing device according to the present invention will be described with reference to the drawings.

Figure 1:
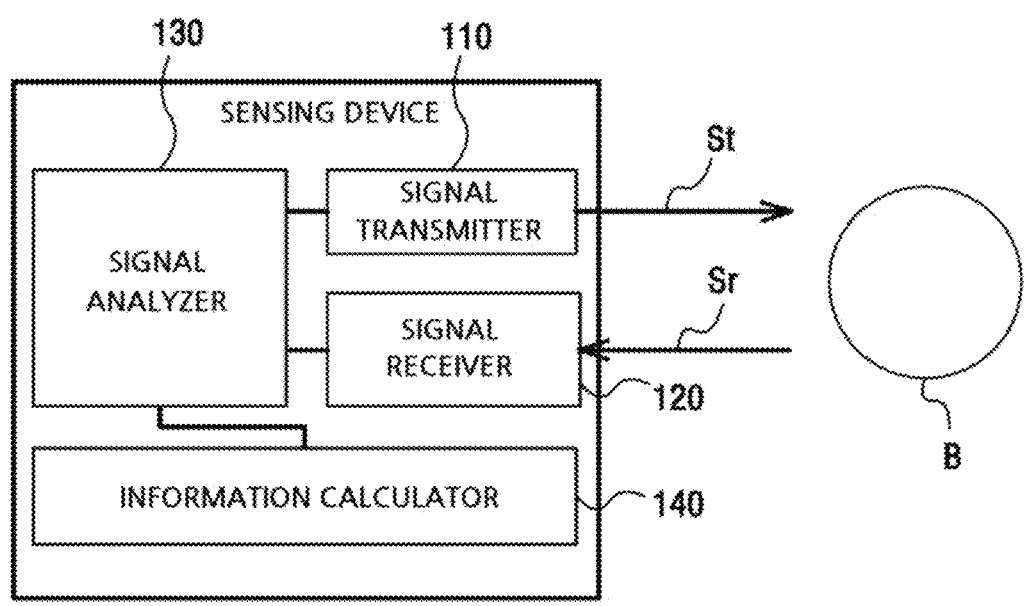
FIG. 1 is a block diagram showing the configuration of a sensing device for a moving ball according to an embodiment of the present invention.

First, with reference to FIG. 1, it will be described that the configuration of the sensing device for a moving ball and a function of each element in the sensing device according to an embodiment of the present invention. FIG. 1 is a block diagram showing the configuration of a sensing device for a moving ball according to an embodiment of the present invention.

A sensing device for a moving ball according to an embodiment of the present invention is basically an apparatus for calculating motion parameters for the moving ball using Doppler Effect of Radar. As shown in FIG. 1, the present invention includes a signal transmitter 110, a signal receiver 120, a signal analyzer 130, and an information calculator 140. The sensing device may be configured to track a ball in motion while transmitting a radar signal of a specific frequency toward the direction of movement of the ball to be moved by a shot at its installation position and receiving and analyzing signals reflected from the moving ball.

The signal transmitter 110 is configured to transmit a specific radar signal in the aimed direction, and may be configured to include a transmission antenna for transmitting a radar signal.

The signal receiver 120 is configured to receive a reflected signal from the moving ball when the radar signal transmitted by the signal transmitter 110 is reflected by the moving ball. The reflected signal transmitted by the signal transmitter 110 and reflected by the Doppler effect in the moving ball changes the frequency of the signal transmitted by the signal transmitter 110, resulting in a Doppler shift. That is, the signal receiver 120 will receive a signal shifted by the Doppler shift.

The signal receiver 120 is configured to be provided with a plurality of receiving antennas for receiving the reflected signals so that the ballistic and direction angle information of the ball moving using the phase difference of the received signals of the plurality of receiving antennas can be calculated. The configuration using the plurality of receiving antennas is already disclosed in the prior art related to the radar sensor, so a detailed description thereof will be omitted.

Meanwhile, the signal analyzer 130 is configured to analyze the reflected signals received by the signal receiver 120 so as to calculate position coordinate of the moving ball at a predetermined time interval.

Although not shown in figures, the sensing device according to an embodiment of the present invention may further include a low-pass filter to obtain a low-frequency component by filtering the reflected signals received by the signal receiver 120.

The signal analyzer 130 may be configured to analyze not only the reflected signals received by the signal receiver 130, but also the signals filtered by the low-pass filter, and the signal analyzer 130 may be configured to perform statistical analysis such as a moving average for the position coordinate data of the moving ball calculated based on the analysis of the reflected signals.

The signal analyzer 130 is preferably configured to calculate trend data as data representing a trend of the position coordinates of the moving ball by preset signal processing and statistical analysis of the position coordinates of the moving ball.

That is, the signal analyzer 130 is configured to analyze the low-pass filtering signals and the position coordinate data of the moving ball calculated based on the analysis of the received reflected signals so as to calculate coordinate data corresponding to the calculated each ball position as the filtering coordinate data, and calculate data corresponding to the coordinates according to the moving average for the position coordinate data of the moving ball so as to calculate trend data which is data representing a trend with respect to the position coordinates of the moving ball by a predefined function using the filtering coordinate data and the coordinate data according to the moving average.

Figure 4:
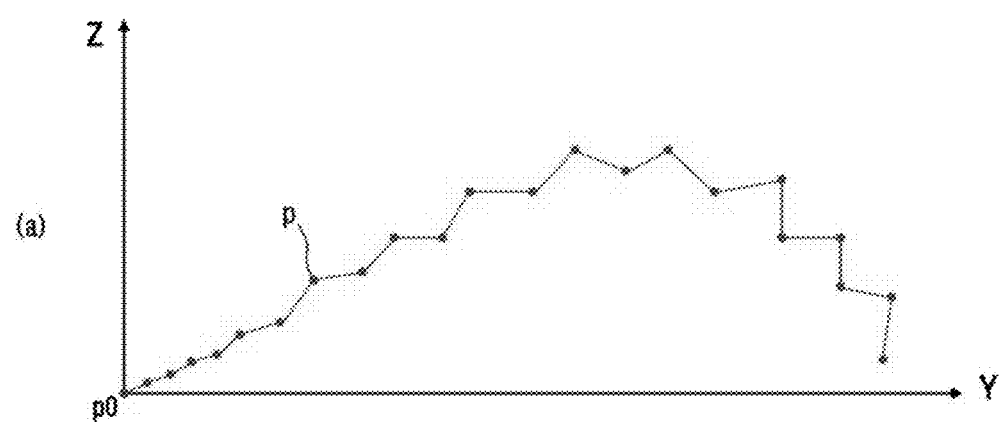
Figure 4:
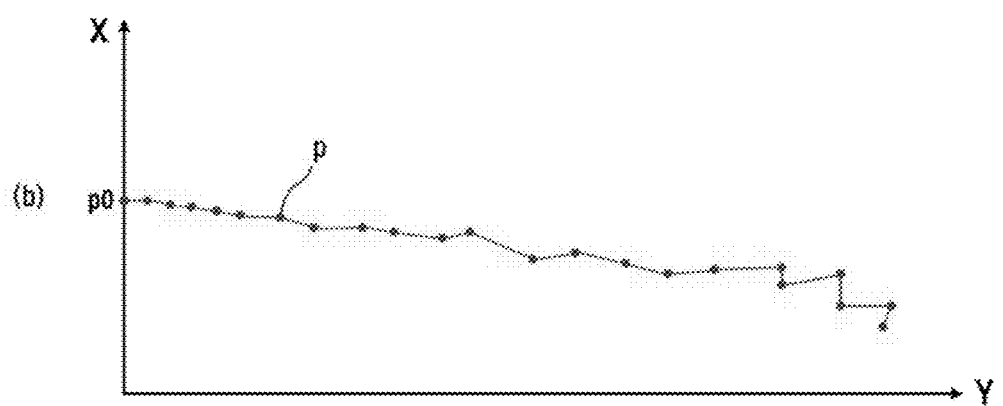

Since the reflected signals received by the signal receiver 120 often includes unspecified noises, the analysis results of the received signals are often not completely accurate data. For example, as shown in FIGS. 4 (a) and (b), the line connecting the position coordinates (p) of the moving ball is quite constant in a certain section but appears in a fairly irregular shape in many sections.

The sensing device according to an embodiment of the present invention calculates information on a trend indicating the directionality with respect to the position coordinates of the ball calculated from the analysis of signals including noises as stated above, and uses it for processing of sensing data.

The trend data may be calculated in various ways. For instance the trend data may be calculated by an analysis of filtering signals filtered from the reflected signals or may be calculated by statistical analysis such as a moving average of ball position coordinates.

Since the low-pass filtered signals filtered from the received reflected signals can remove noises included in high-frequency components to some extent, the filtering coordinate data described above may be referred to as coordinate data from which noises are removed to some extent.

However, since filtering not only noises but also high-frequency components of the original signals by filtering the received reflected signals using a low-pass filter, the filtering coordinate data cannot be regarded as more accurate coordinate data.

As shown in FIGS. 4(a) and 4(b), coordinates calculated through a moving average for position coordinates of the moving ball that is irregularly distributed may also not be accurate coordinate data.

However, if a predefined function is used to appropriately confuse the above-mentioned filtering coordinate data and coordinate data calculated through a moving average, it is possible to calculate trend data indicating a trend of the distribution of the position coordinates of the moving ball. The function predefined for the confusion may be determined by a number of experiments and simulations to find the most suitable one.

The trajectory according to the trend data is also not an accurate ball trajectory, but it can be used as a criterion for determining which predicted ball trajectory among the various predicted ball trajectories to be described below is the closest or most consistent ball trajectory. Details of the above matters are will be described later.

Meanwhile, a more detailed description of a method for calculating position coordinate data of the ball moving at a preset time interval through analysis of radar Doppler signals will be described later.

The information calculator 140 is configured to calculate an initial motion condition of the moving ball using the position coordinate data of the ball calculated by the signal analyzer 130.

Then, the information calculator 140 is configured to generate predicted ball trajectories corresponding to each trial spin by applying trial spin information of various values by a predetermined process under the calculated initial motion conditions of the moving ball, and to determine the trial spin information applied to the trajectory that best matches with the calculated position coordinates of the ball among the generated predicted ball trajectories, as final spin information.

More details related to the calculation of the final spin information using 'the initial motion conditions of the moving ball' and the trial spin information will be described later.

Figure 2:
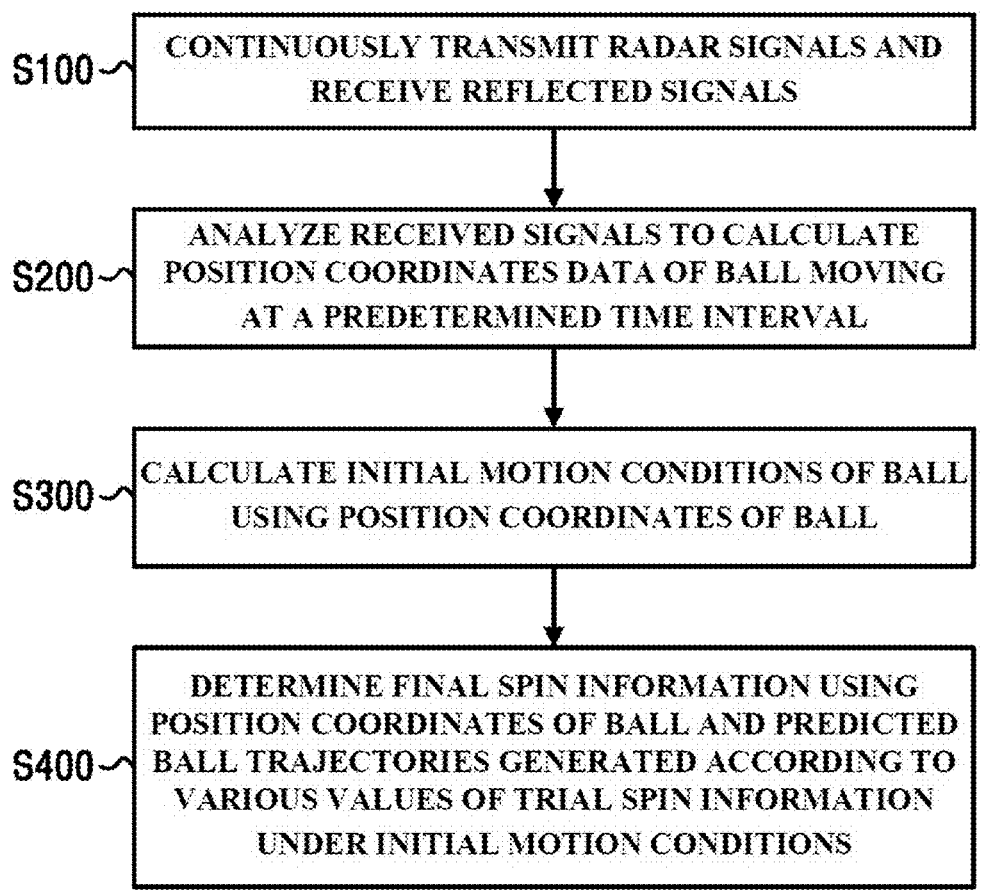
FIG. 2 is a flowchart showing an outline process of a method for calculating motion parameters of the moving ball according to an embodiment of the present invention.

Meanwhile, a method for calculating motion parameters of the moving ball using the sensing device according to an embodiment of the present invention will be described with reference to FIG. 2. FIG. 2 is a flowchart showing a process of the method for calculating motion parameters of the moving ball according to an embodiment of the present invention.

As shown in FIG. 2, the method for calculating motion parameters of the moving ball according to an embodiment of the present invention includes four main steps, wherein the motion parameters of the moving ball refers to the kinematic elements that can define the motion of the ball including ball speed, azimuth of the ball, direction of the ball and spin (back spin and side spin) information.

First, the radar signal is continuously transmitted by the signal transmitter before the ball moves, and the signal receiver continuously receives the reflected signal reflected by the ball or the like on the transmitted signal (S100).

When the reflected signal is received, the signal analyzer analyzes the received signal to calculate position coordinate data of the ball moving at a predetermined time interval (S200).

Preferably, the signal analyzer may calculate trend data which is data representing a trend with respect to the position coordinates of the ball using filtering coordinate data calculated using filtering signals that has passed through a low-pass filter for the received reflected signal along with the position coordinate data of the ball and coordinates according to a moving average for the position coordinate data of the ball through a predefined function.

When the positional coordinate data of the moving ball is calculated by the signal analyzer, the information calculator calculates the initial motion condition of the ball using the calculated positional coordinate data of the ball (S300).

Where, the 'initial motion condition of the ball' refers to the initial ball speed, azimuth (height angle) and direction angle information of the moving ball, which means not merely launch speed and launch angle when the ball at rest starts to move but ball speed, azimuth and direction angle of the ball calculated from the initial ball trajectory of the moving ball.

More specifically, a confidence interval of data for accurate calculation of the initial motion condition of the moving ball is set as 'initial confidence interval', and the ball speed, azimuth and direction angle of the ball calculated based on the ball trajectory calculated using the position coordinates of the ball within the set 'initial confidence interval' can be defined as the 'initial motion condition of the ball'

More details for setting of the 'initial confidence interval' and the calculation of the 'initial motion condition of the ball' will be described later.

Meanwhile, if the initial motion conditions of the ball are calculated as described above, the information calculator performs to generate various values of trial spin information, to finally select the most accurate predicted ball trajectory using the predicted ball trajectories generated according to various values of the trial spin information generated under the calculated initial motion condition of the ball along with the trend data as described above, and to determine the trial spin information applied to the finally selected predicted ball trajectory as the final spin information S400.

Wherein, the spin information to be finally determined is a back spin and a side spin, and the above-mentioned 'trial spin information' includes a back spin value and a side spin value as a set, and thus the spin information finally determined includes both the backspin value and the sidespin value.

More details of the process of finally determining the spin information using the trial spin information and the predicted ball trajectory will be described later.

Hereinafter, a detailed description of each step shown in FIG. 2 will be described in more detail with reference to FIGS. 3 to 16.

Figure 3:
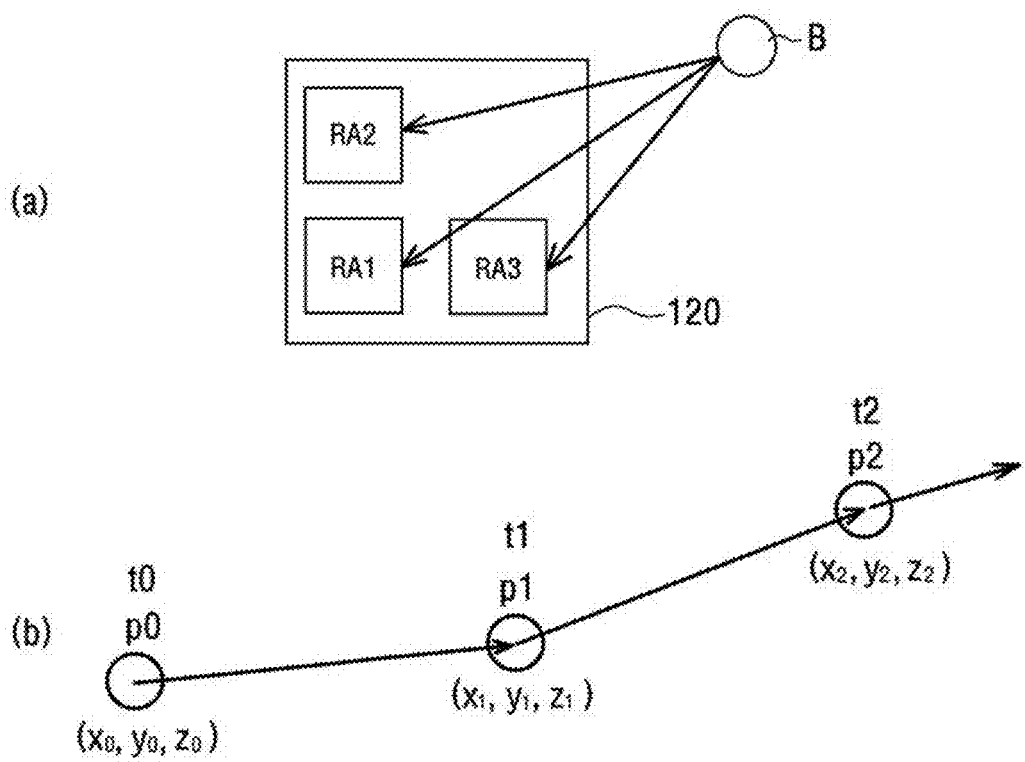
FIGS. 3 to 5 are diagrams for explaining detailed matters of calculating position coordinate data of a ball moving at a predetermined time interval by analyzing a received signal by a sensing device according to an embodiment of the present invention.

First, with reference to FIG. 3, the details of the above-described step S200, that is, the signal analyzer analyzes the received signal and calculates position coordinate data of the ball moving at a preset time interval will be described.

The signal analyzer of the sensing device according to an embodiment of the present invention analyzes the received reflected signal to calculate the position coordinates of the ball at predetermined time intervals.

The present invention has technical features that if the position coordinates of the ball are calculated in any way, the trajectory of the ball is accurately predicted using the position coordinates of the ball and the spin information of the ball applied to the accurately predicted ball trajectory can be calculated.

Therefore, the method of calculating the position coordinate data of the moving ball may be a calculation method according to the prior art or may be calculated in a special method completely different from the prior art, the present invention has the feature that the motion parameters of the ball can be accurately calculated in terms of the trajectory of the ball using the position coordinate data of the ball calculated in any way.

FIG. 3(a) shows an example of the configuration of the signal receiver 120 of the sensing device according to an embodiment of the present invention. As shown, the signal receiver 120 is configured by properly arranging three or more receiving antennas including RA1, RA2 and RA3, and each of the receiving antennas RA1, RA2 and RA3 receives the reflected signal received from the ball B. It is possible to calculate the height angle and the direction angle of the moving ball B using the phase difference of the signals between the respective receiving antennas, respectively.

For example, according to the arrangement of the receiving antennas in the signal receiver 120 shown in FIG. 3(a), the azimuth of the moving ball B using the phase difference of the signals received by RA1 and RA2 is calculated, and the direction angle of the moving ball B using the phase difference of the signals received by RA1 and RA3.

Wherein, as the signal receiver 120 receives the reflected signals, the distance between the moving ball B and the signal receiver 120 can be easily calculated.

Therefore, when the signal receiver 120 receives the reflected signals reflected from the moving ball B, the distance to the ball B, the azimuth of the ball B, and the direction angle of the ball B can be calculated, and using those information, the position coordinate data of the moving ball B can be also calculated.

FIG. 3(b) shows an example of calculating the position coordinates of the moving ball at a predetermined time interval by the sensing device according to an embodiment of the present invention. FIG. 3(b) shows calculating ball position coordinates using the position p0($x_0$, $y_0$, $z_0$) at time t0, the position p1($x_1$, $y_1$, $z_1$) at time t1, the position p2($x_2$, $y_2$, $z_2$) at time t2, etc.

The initial position of the ball, p0 ($x_0$, $y_0$, $z_0$) is the position coordinate of the ball in a stationary state, which can be set to, for example (0, 0, 0).

After the ball starts at the p0 position, the signal receiver 120 continuously receives the reflected signals and calculates the distance to the ball, the azimuth of the ball, and the direction angle at each predetermined time interval ($\Delta t = t1 - t0 = t2 - t1$). Then, it is possible to calculate the position coordinates of the ball for each time using the X-Y-Z coordinate system.

The position coordinates data of the ball may be calculated at predetermined time intervals from ball launching to reaching a ground in the manner described above.

FIG. 4 shows an example of the position coordinate data of the ball calculated in the manner described above. FIG. 4(a) shows the position coordinate data of the ball on the Y-Z plane, and FIG. 4(b) shows the position coordinate data of the ball on the X-Y plane, and these shows the position of the ball in the three-dimensional space X-Y-Z on the Y-Z plane and the X-Y plane, respectively.

Since the position p of each ball can actually be calculated at a much narrower time interval, the points indicating much more positions than that shown in FIG. 4 may appear at much narrower intervals, however it is indicated in the specification at wide intervals for the understanding of the technology.

As shown in FIGS. 4(a) and 4(b), it can be seen that an actual motion trajectory of the ball does not pass all of the displayed position coordinates of each ball calculated according to the above stated method for calculating the position coordinate information.

In order to determine accurate spin (backspin and sidespin) information for a moving ball, it is necessary to calculate an accurate ball trajectory, and the exact ball trajectory accurately passes some of the positions of the ball and the exact trajectory is forced to pass from others of the positions slightly out of range.

For example, as shown in FIGS. 5(a) and (b), the actual ball trajectory BT may be formed by passing through some of the positions of the ball and partially deviating to some extent.

Figure 5:
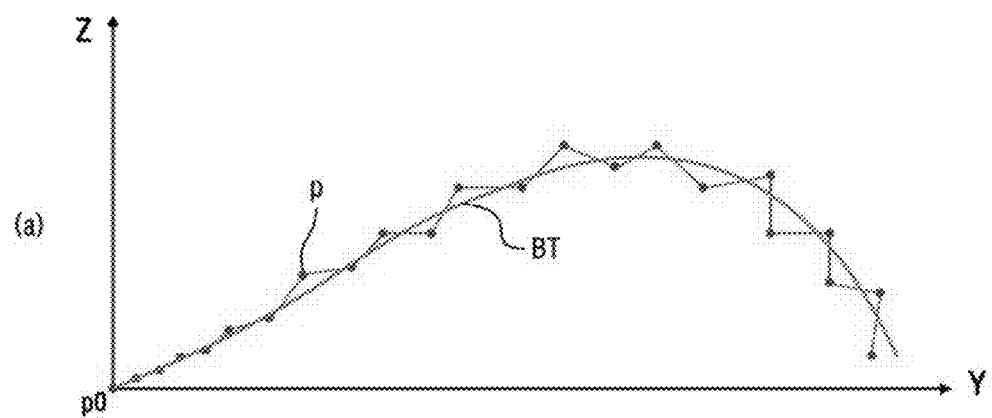
Figure 5:
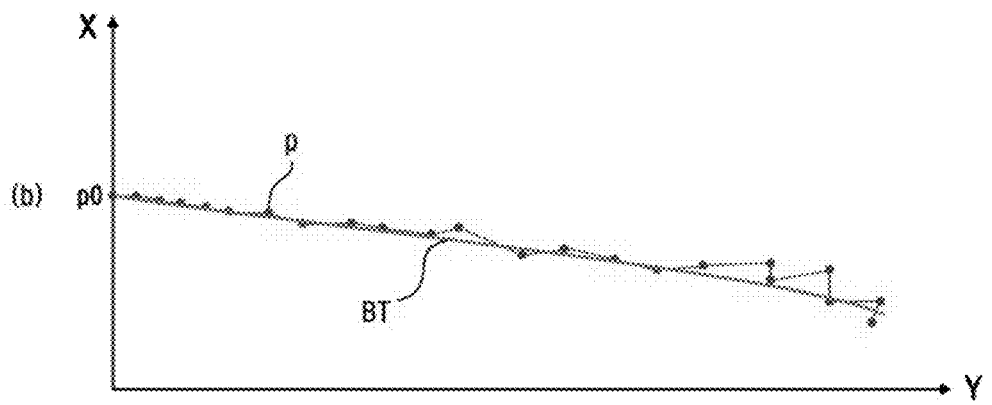

Accordingly, the present invention, using the position coordinates of the ball calculated as shown in FIGS. 4 (a) and 4 (b), is to determine the spin information of the ball applied to the trajectory as the final spin information by finding the trajectory closest to the actual ball trajectory (BT) as shown in FIGS. 5 (a) and 5 (b).

To this end, as described through FIG. 2, the initial motion conditions of the ball are calculated using the position coordinate data of the ball, and it is preferable to perform a process of determining a trajectory that best matches the trajectory of the trend data according to the motion of the ball among the predicted ball trajectories generated according to various values of the trial spin information under the calculated initial motion conditions of the ball so as to determine the trial spin information applied to the determined trajectory as the final spin information.

Wherein among the predicted ball trajectories, the most "matching" to the trajectory of the trend data according to the motion of the ball does not necessarily mean that the trend data necessarily exist as coordinates on the predicted ball trajectory, but means the predicted ball trajectory is "closest" to the actual ball trajectory. Indeed, the trajectory according to the trend data and the finally determined predicted ball trajectory can be quite consistent in the highly reliable part of the trend data, and there may be some slight errors in the little reliable part of that.

That is, as described above, according to the data reliability of each trend data, the predicted ball trajectory is formed to match the data reliability for the trend data can be regarded as a case of "matching" according to a predicted ball trajectory passes or passes very closely at the trend data having high data reliability, and passes within the error range at the trend data having low data reliability.

There are various data such as high data reliability and low data reliability among the above described trend data, and the present invention sets a "weight" for each trend data to reflect the data reliability of each trend data in calculation during calculation.

These are included in steps S300 and S400 on the flowchart shown in FIG. 2, hereinafter, with reference to FIGS. 6 to 16, the 'calculation of the initial movement condition of the ball' in step S300 and the 'generation of trial spin information and the predicted ball trajectory and determination of the final spin information' in step S400 will be described in more detail.

First, with reference to FIGS. 6 to 8 will be described with respect to the 'calculation of the initial movement conditions of the ball' process.

Figure 6:
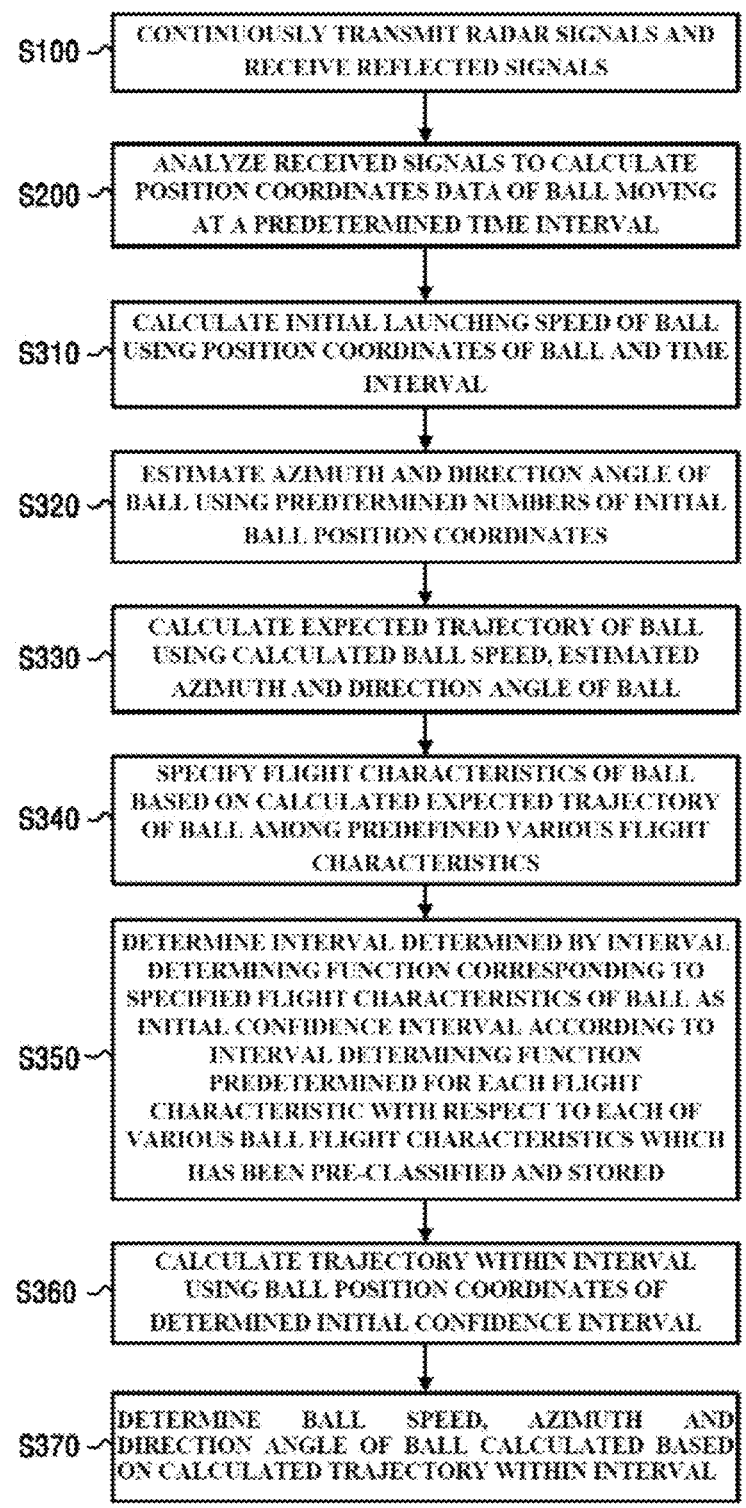
FIG. 6 is a flowchart showing a specific process for calculating the initial motion condition of the ball in the flowchart shown in FIG. 2.
Figure 7:
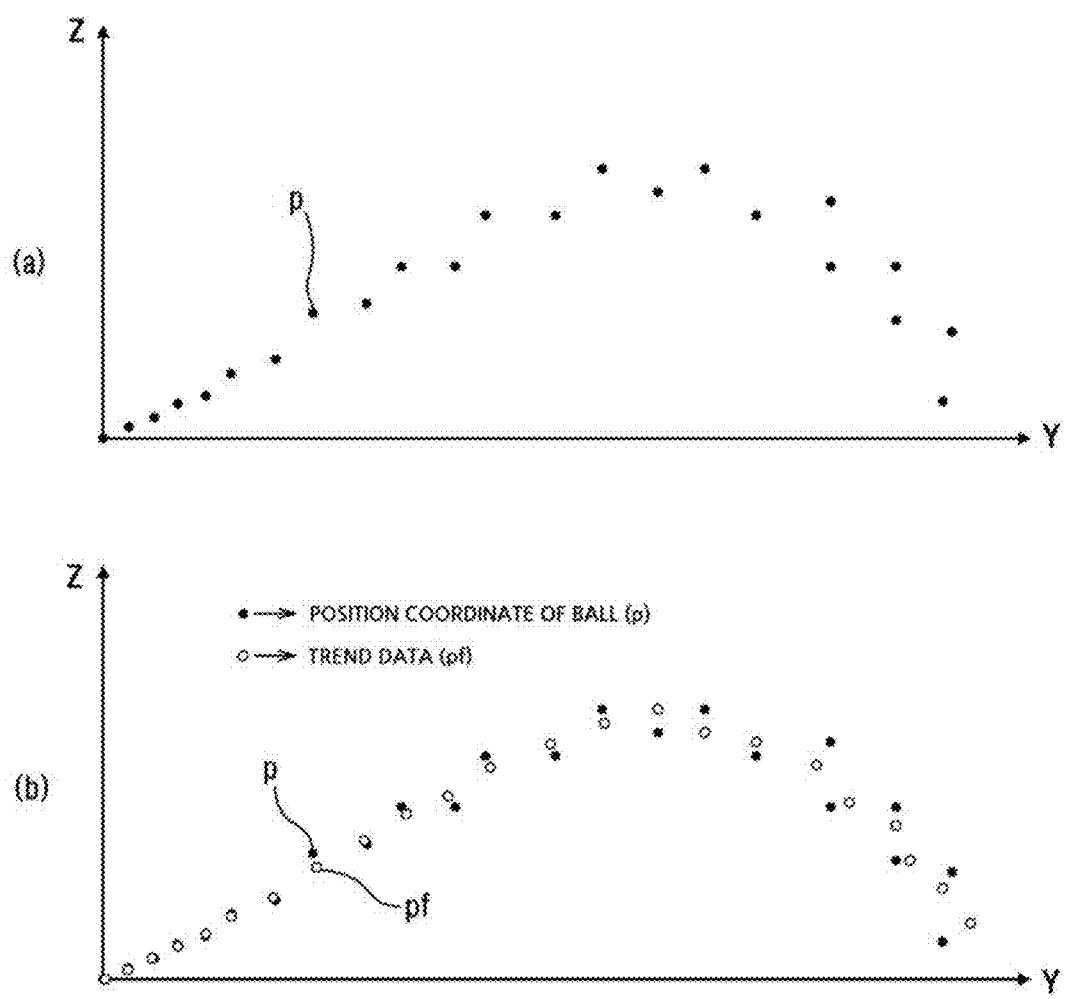
FIGS. 7 and 8 are figures for describing a process according to the flowchart shown in FIG. 6.
Figure 8:
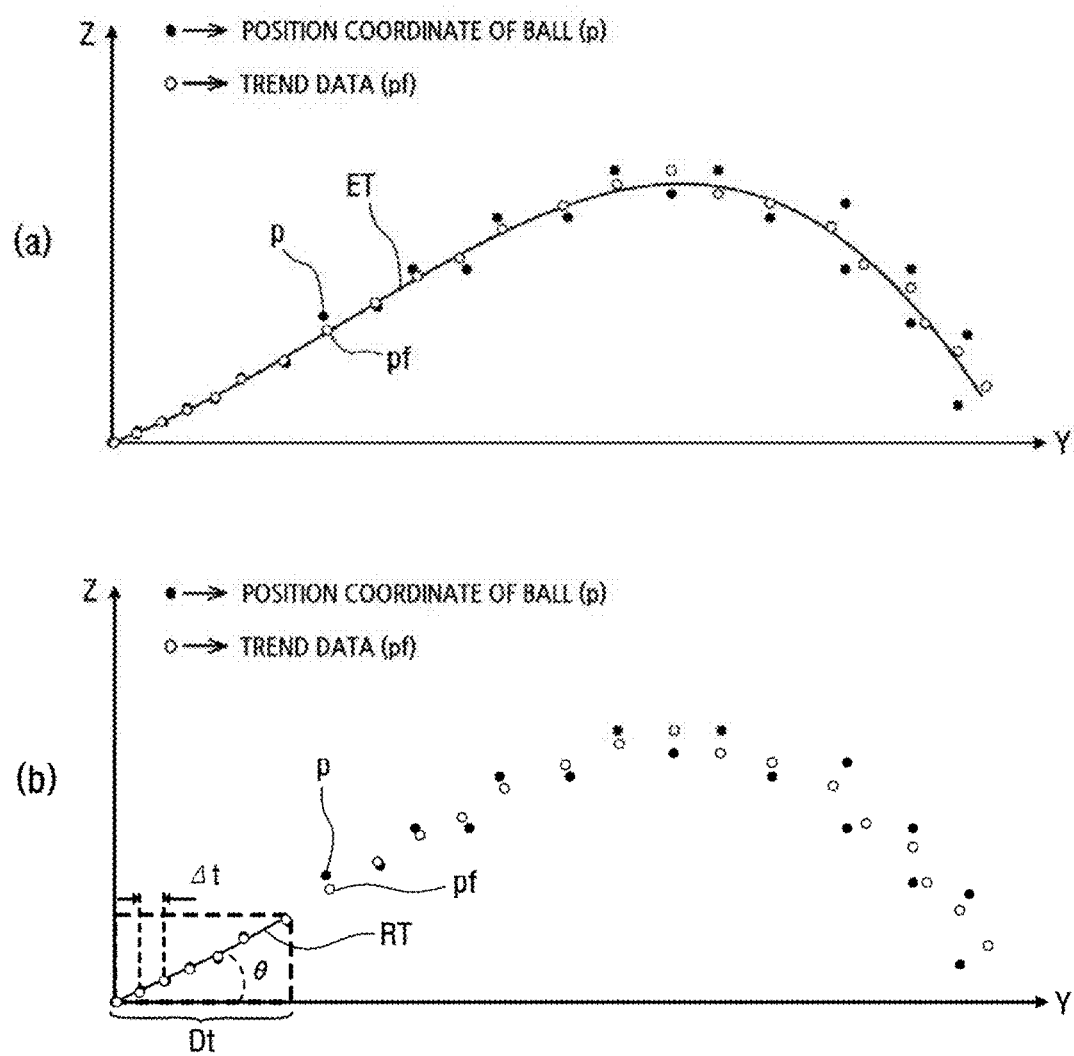

FIG. 6 is a flowchart showing a more specific process for step S300 shown in FIG. 2, and FIGS. 7 and 8 are initial confidence intervals for ball position coordinates and show an example of calculating the initial exercise condition according to the process shown in FIG. 6.

As described above, after the position coordinate data of the ball is calculated (S200), the launching speed of the ball is calculated using the ball position coordinate and the time interval (S310).

Meanwhile, azimuth and direction angle of the ball is estimated by using a preset number of initial coordinates among the position coordinates of the ball S320.

The azimuth and direction angle information can be estimated in various ways. For example, a predetermined number of position coordinates are selected and the azimuth and direction angle information can be calculated for a trajectory generated by curve fitting a straight line connecting each coordinate position.

In this case, in estimating the azimuth and the direction angle of the ball, the trend data may be used without using the position coordinates of the ball, or the position coordinates of the ball and the trend data may be used in combination. The above azimuth and direction angle are not the final calculated values, but are temporary values for use in determining the initial confidence interval to be described later.

The calculation of the trend data may use filtering position coordinates calculated based on the signal filtered by the low-pass filter of the received reflected signals, or may use the moving average for the position coordinates of the ball and the filtering position coordinates in combination.

For example, a trajectory corresponding to an average of trajectories based on a preset number of position coordinates and trajectories based on a preset number of trend data may be generated, and azimuth and direction angle for the generated trajectory may be respectively calculated.

FIG. 7 shows an example of position coordinates and trend data of the ball as described above.

FIG. 7(a) shows the position coordinates (p) of the ball calculated in the manner described in FIGS. 4 and 5, and FIG. 7(b) shows the trend data (pf) along with the position coordinates (p) of the ball. Wherein it has been described above that the trend data may be filtering position coordinates calculated by low-pass filtering, or data obtained by calculating a moving average of the ball's position coordinates and the filtering position coordinate data through a predefined function.

In FIGS. 7(a) and 7(b), each position coordinate is shown on the Y-Z plane, and the position coordinate on the X-Y plane is omitted for convenience. Indeed, each position coordinate (p, pf) is on the three-dimensional space of X-Y-Z, and all trajectories are calculated and generated in the 3D space. In the figures to be described below, all descriptions of the trajectories on the Y-Z plane are related to position coordinates and trajectories in the three-dimensional space, and portions of the position coordinates and trajectories on the X-Y plane are omitted for convenience of explanation.

In FIG. 6, as described above, when the launching speed of the ball and the estimated azimuth and direction angle are obtained, an expected trajectory of the moving ball is calculated using the obtained azimuth and direction angle in S330 step.

Wherein, the "expected trajectory of the moving ball" is different from the "predicted ball trajectory" which will be described later, and the 'expected trajectory of the ball' is for determining an "initial confidence interval" for calculating the initial motion conditions of the ball.

The 'expected trajectory of the ball' may be calculated by applying a predetermined spin information to the launching speed of the ball and the estimated azimuth and direction angle of the ball. Wherein, the 'predetermined spin information' may be preset fixed value of spin information or temporary spin information to be calculated by a simple parameter such as speed determined by a preset function as spin information to be temporarily applied.

As described above, the 'expected trajectory of the ball' may be calculated using the ball's speed, the ball's azimuth and direction angle temporarily obtained, and predetermined spin information. The 'expected trajectory of the ball' is for determining an initial confidence interval, so it is not necessary to accurately calculate the expected trajectory of the ball.

As described above, when the expected trajectory of the ball is calculated, the trajectory and carry distance, etc. can be known therefrom, and the flight characteristics of the ball can be specified using this in S340.

Wherein the flight characteristics of the ball may be, for example, characteristics of a general ball trajectory according to shots for each golf club, where the information of the flight characteristics may be previously stored for each shot.

In general, the ball trajectory may have a long carry distance and a low angle such as a driver shot or a wood shot, and sometimes a short carry distance and a high angle such as an approach shot, and flight characteristics of iron shots can be different according to a type of iron clubs.

An interval determined by an interval determining function corresponding to the specified flight characteristics of the ball can be determined and set as the initial confidence interval according to the interval determining function predetermined for each flight characteristic with respect to each of the various flight characteristics of the ball as stated above.

The sensing device according to an embodiment of the present invention may classify and store information about a shot for each golf club as a flight characteristic of the ball.

The sensing device according to an embodiment of the present invention may determine and set an interval determined by an interval determining function corresponding to the specified flight characteristics of the ball as the initial confidence interval according to the interval determining function predetermined for each flight characteristic with respect to each of the various ball flight characteristics which has been pre-classified and stored in S350.

Wherein the interval determining function predetermined for each flight characteristic information may be determined by variables such as ball speed.

For example, in the case of a driver shot, when an interval determining function in which a ball speed is a variable is set, requirements such as ballistic and carry distance of the calculated expected ball trajectory are determined to correspond to the flight characteristics of the driver shot and the interval from the interval determining function by the ball speed is determined a distance of 5 m, the sensing device may determine an interval corresponding to the distance of 5 m from the initial coordinate of the ball as the 'initial confidence interval'.

Even if the flight characteristics are the same due to the above interval determining function, the initial confidence interval may be changed according to a predetermined function variable such as ball speed. That is, it is preferable that the initial confidence interval is a variable interval for the same flight characteristics.

As described above, After the expected ball trajectory is calculated using the estimated values of the ball speed, the approximate azimuth and direction angle, the flight characteristics of the ball is determined using the calculated expected ball trajectory, and an interval determined by the interval determining function predetermined with respect to the determined flight characteristics is determined as the initial confidence interval, the trajectory in the initial confidence interval is calculated using the coordinates of the ball in the determined initial confidence interval in S360.

If the initial confidence interval and the trajectory in the initial confidence interval are calculated, the azimuth and direction angle may be calculated based on the calculated trajectory in the initial confidence interval, and the ball speed calculated in step S310 may be used as it is, or it is also possible to newly calculate a ball speed by using the time interval and location information of two points within the calculated interval in the trajectory. The ball speed, azimuth and direction angle finally calculated may be determined as the 'initial motion condition of the moving ball' described above in S370.

FIG. 8 shows an example of the determination of the 'calculation of the expected trajectory of the ball' and the 'initial confidence interval'.

FIG. 8(a) shows the distribution of the ball position coordinates (p) and the trend data (pf), and using these to calculate and display the expected ball trajectory (ET).

When the expected ball trajectory (ET) is calculated by method described above, the carry distance and ballistic, etc. can be grasped from the calculated expected ball trajectory (ET), and the flight characteristics of the ball can be grasped from the identified information, and a distance interval determined by the interval determining function predetermined with respect to the determined flight characteristics is determined as the initial confidence interval.

The determination of the initial confidence interval is shown in FIG. 8(b).

As shown in FIG. 8(b), the trajectory in the interval RT is calculated using each ball position coordinate or trend data in the initial confidence interval Dt determined from the expected ball trajectory ET shown in FIG. 8(a), and the final information of azimuth θ and direction angle (not shown) are determined by the calculated trajectory in the interval RT, and a ball speed, the above stated azimuth and direction angle can be determined as the initial motion conditions of the ball.

In FIG. 8(b), Δt represents a time interval between the position coordinates (or filtering position coordinates) of each ball position.

As described above, when the 'initial motion condition of the moving ball' is finally determined, a process for determining final spin information is performed, which will be described with reference to FIGS. 9 to 16.

Figure 9:
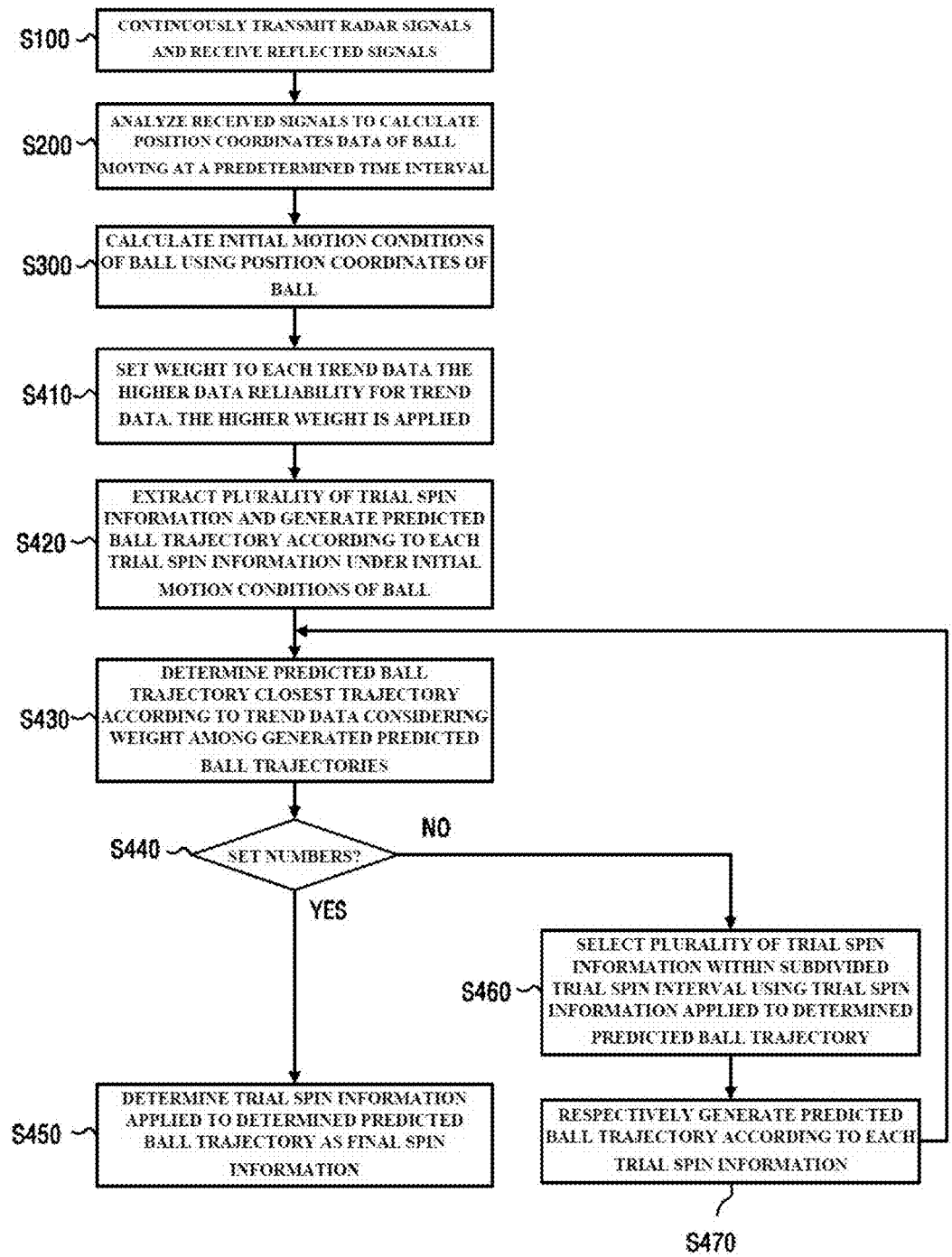
FIG. 9 is a flowchart illustrating a specific process for determining the spin of a ball in the flowchart shown in FIG. 2.

FIG. 9 is a flowchart showing a process for finally determining the above-described spin of the ball, and FIGS. 10 to 16 are shows for explaining a process according to the flowchart shown in FIG. 9.

After calculating the position coordinate information of the ball, the trend data and the initial motion conditions of the ball in steps S100, S200, and S300 described above with reference to FIGS. 2 to 8, the higher the data reliability for the trend data, the higher the weight is applied to each trend data in the step S410.

Figure 10:
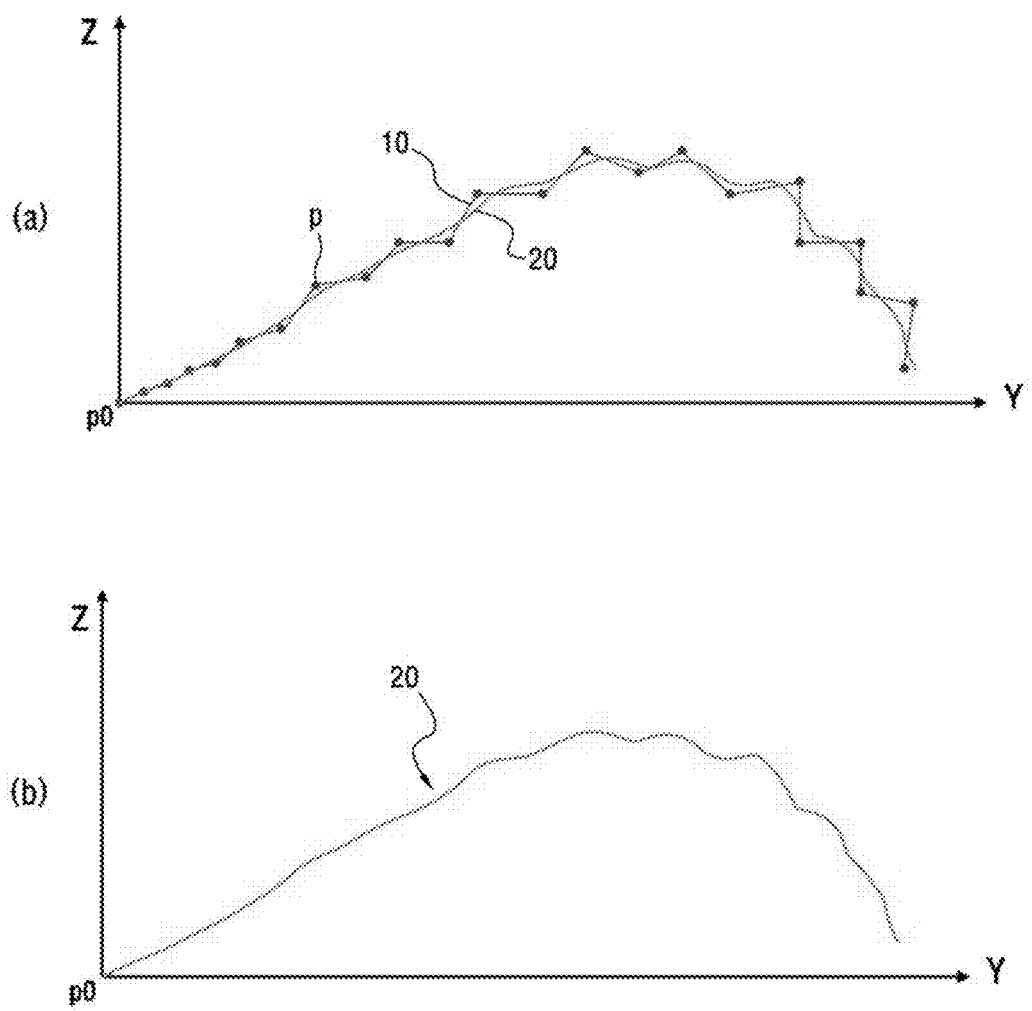
FIGS. 10 to 16 are figures for describing a process according to the flowchart shown in FIG. 9.

Consideration of the data reliability of the above trend data and application of the weight accordingly will be described with reference to FIG. 10.

FIG. 10(a) shows the position coordinates (p) of the ball and the line 10 connecting them and the trajectory 20 connecting the trend data thereto, and FIG. 10(b) shows the trajectory 20 according to the trend data.

In FIG. 10(a), it compares the two points of 'the position data (p) of each ball on the line 10 connecting the ball position coordinates' and 'the trend data (coordinates) on the trajectory 20 according to the trend data corresponding to (in the same time of) each the position data' to get the "difference".

The larger the 'difference', the lower the data reliability of the trend data, and the smaller the 'difference', the higher the data reliability of the trend data.

Accordingly, a high weight is set for trend data having high data reliability and a lower weight is set for trend data having low data reliability based on the above-mentioned 'difference'. The criteria for data reliability and weighting can be determined by experimentation or experience. The important thing is that the higher the data reliability is, the higher the weight is applied to, and the weight is set for each of the trend data.

Meanwhile, as described above, after weighting is applied to each trend data, the sensing device extracts a plurality of trial spin information and generates predicted ball trajectories according to each trial spin information under the determined 'initial motion condition of the ball' in S420.

Wherein the trial spin information refers to a value obtained by setting a backspin and a sidespin as a set. For example, if trial spin information of S1 is applied, S1 trial spin information includes (BS2, SS2). Here, BS1 means trial backspin information, and SS1 means trial sidespin information.

The plurality of trial spin information may be simply a plurality of randomly selected spin information. The intervals of values for selecting a plurality of trial spin information are predetermined, and a representative value in each interval (which may be an average value or an intermediate value of the interval) may be respectively selected as the trial spin information.

For example, in relation to the flight characteristics of the ball as described above, the average or general spin information for each flight characteristic is predetermined, and an interval of a value is determined from the predetermined spin information, and a plurality of trial spin information within the predetermined interval can be selected.

A representative value of each interval divided into preset units in a preset range can be selected, wherein the representative value may be an average value, a median value, or a maximum or minimum value in each interval.

That is, when the predetermined backspin range and the preset sidespin range are respectively divided and intersected in a predetermined unit, a plurality of intervals are generated, and the representative value of each corresponding interval is selected as the above stated spin information, where when a specific representative value is selected, the interval to which the representative value belongs is further subdivided (divided into narrower units), and the representative values corresponding to the more subdivided intervals are used as trial spin information to calculate the predicted ball trajectory, and the interval to which the representative value belongs is further subdivided more in the calculated predicted ball trajectory and the representative values corresponding to the more subdivided intervals are used as trial spin information. In this way, the spin value of the increasingly subdivided interval can be selected as the trial spin information.

When the trial spin information is selected as described above in step S420, a predicted ball trajectory is generated by each trial spin information under the 'initial motion condition of the ball', where each the predicted ball trajectory is created by taking into account that the motion condition is changed by the spin after ball moving under the initial motion condition of the ball.

Figure 11:
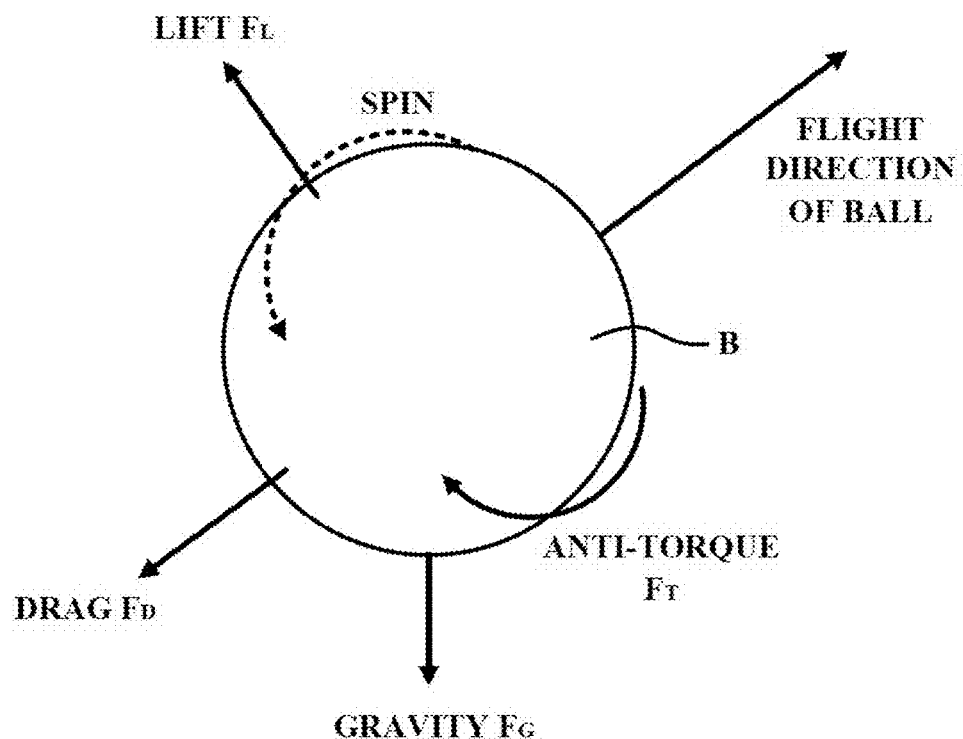

Wherein, as shown in FIG. 11, it should be considered that the moving ball is affected by external forces such as lift $F_L$, drag $F_D$, anti-torque $F_T$, and gravity $F_G$ by the spin.

FIG. 11 shows various external forces affected when the moving ball moves in the direction of ball movement.

As shown in FIG. 11, the lift $F_L$ is a force acting perpendicular to the direction of movement of the ball to float the ball high, and the drag $F_D$ is a force acting in the opposite direction to the direction of movement of the ball to reduce ball speed. Anti-torque $F_T$ is a rotational force that decreases the spin of the ball and acts to reduce the spin amount of the ball. Gravity $F_G$ acts toward the ground regardless of the direction of movement of the ball, causing the moving ball to drop to the ground.

Wherein, the spin parameter Sp according to the spin of the moving ball is as shown in (Equation 1) below, and generally the lift coefficient $C_L$, the drag coefficient $C_D$, and the anti-torque coefficient $C_T$ can be respectively determined through the spin parameter of (Equation 1) below.

$$S_p = \frac{r\omega}{V} \quad \text{(Equation 1)}$$

Wherein, r is the radius of the ball, V is the ball speed, and ω is the spin rate of the ball.

That is, the radius of the ball, r, is a known value, and the speed of the ball is also a value that is already measured, and the spin rate of the ball is a value that can be known from the trial spin information. Therefore, for each predicted ball trajectory, spin parameters Sp can be calculated using the trial spin information of the trajectory, and after obtaining the spin parameter, the lift coefficient $C_L$, the drag coefficient $C_D$, and the anti-torque coefficient $C_T$ for each of the predicted ball trajectories can be respectively determined using the spin parameter, and lift ($F_L$), drag ($F_D$) and anti-torque ($F_T$) can be respectively determined using the above stated coefficients as shown in (Equation 2) to (Equation 4) below.

$$F_L = C_L \frac{\rho A V^2}{2} \quad \text{(Equation 2)}$$

$$F_D = C_D \frac{\rho A V^2}{2} \quad \text{(Equation 3)}$$

$$F_T = C_T \frac{\rho A V^2}{2} d \quad \text{(Equation 4)}$$

Wherein, $C_L$, $C_D$, and $C_T$ represent lift coefficient, drag coefficient, and anti-torque coefficient, respectively, ρ represents the density of fluid, that is, air density, A represents the cross-sectional area of the ball, and d represents the diameter of the ball.

As shown in the above (Equation 1) to (Equation 4), the diameter or radius of the ball, the cross-sectional area, the density of the air, etc. are already known values, and the velocity V of the moving ball is already calculated when determining 'the initial motion condition of the ball', and the spin rate ω is known value from the trial spin information. Accordingly, the values of lift $F_L$, drag $F_D$ and anti-torque $F_T$ can be calculated from the above-described values, and gravity $F_G$ is a value that can be calculated by a predetermined gravity acceleration value.

As described above, the initial motion condition of the ball is determined, and a plurality of trial spin information is selected, from which lift $F_L$, drag $F_D$, anti-torque $F_T$ and gravity $F_G$ for each trial spin information can be calculated, thus the predicted ball trajectory using the above values.

Figure 12:
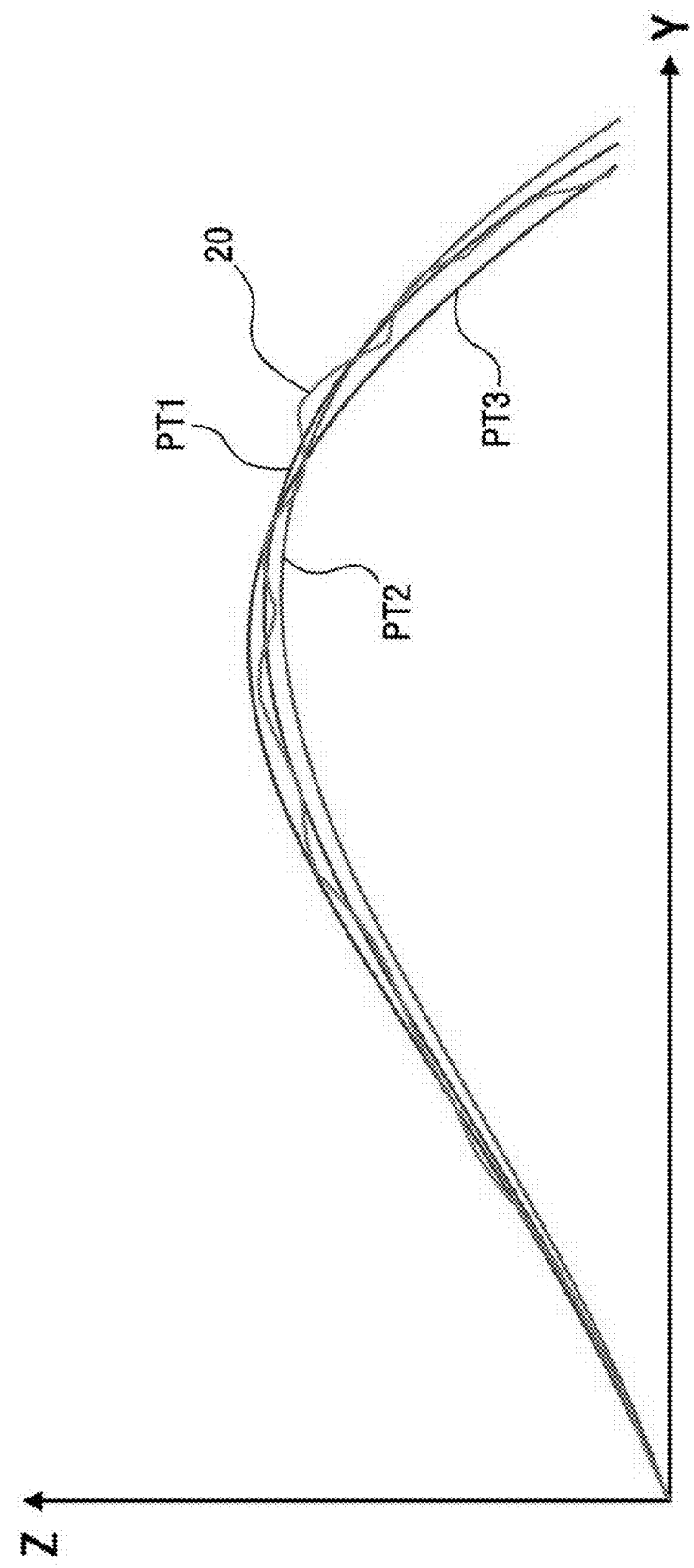

In FIG. 12, various parameters as described above are obtained from each of the plurality of trial spin information, and prediction ball trajectories PT1, PT2, and PT3 generated therefrom are obtained. The predicted ball trajectory may be tens or hundreds, but in FIG. 12, three cases are shown.

The determination of the 'initial motion condition of the ball' has been previously described. If the S1, S2, and S3 have been calculated as a plurality of trial spin information as described above, in state that the determined initial motion condition of the ball is equally applied, the predicted ball trajectory generated according to the S1 trial spin information is PT1, the predicted ball trajectory generated according to the S2 trial spin information is PT2, and the predicted ball trajectory generated according to the S3 trial spin information is PT3, and the above-described predicted ball trajectories PT1, PT2, PT3 are shown as shown in FIG. 12.

As shown in FIG. 12, trend data may be used as a criterion for determining which of the various predicted ball trajectories PT1, PT2, and PT3 respectively generated is closest to the real trajectory of the ball.

That is, the predicted ball trajectory is repeatedly generated in a manner of determining the predicted ball trajectory that best matches the trajectory 20 according to the trend data among the generated predicted ball trajectories, and the final predicted ball trajectory can be determined while determining the most suitable predicted ball trajectory.

The trajectory 20 according to the trend data may be very similar to the actual ball trajectory or may be different to some extent. Because the trend of directionality of some trend data is reflected in state that some of the trend data include noise components of the original coordinates (ball's position coordinates) to some extent, the trajectory 20 according to the trend data differs from the actual trajectory to some extent. Meanwhile the trend of directionality of other trend data is also reflected in state that noise components of the original coordinates in some data of the trend data are removed to some extent. Thus a part similar to the real trajectory and a part different from the actual trajectory exist in the trajectory according to the trend data.

Previously, the data reliability and weight of the trend data were described. In the trajectory according to the trend data, the part similar to the real trajectory is a part in which the data reliability of the trend data is high, that is, a high weighted part, and the part that differs from the real trajectory is another part in which the data reliability of the trend data is relatively low, i.e., relatively low weighted part.

When comparing the predicted ball trajectory and the trajectory according to the trend data in consideration of the characteristics of the trend data as stated above, among the trend data, it is preferable to determine whether or not the data is highly reliable, that is, "matched" by comparing with corresponding coordinate points on the predicted ball trajectory, based on data having a high weight.

Figure 13:
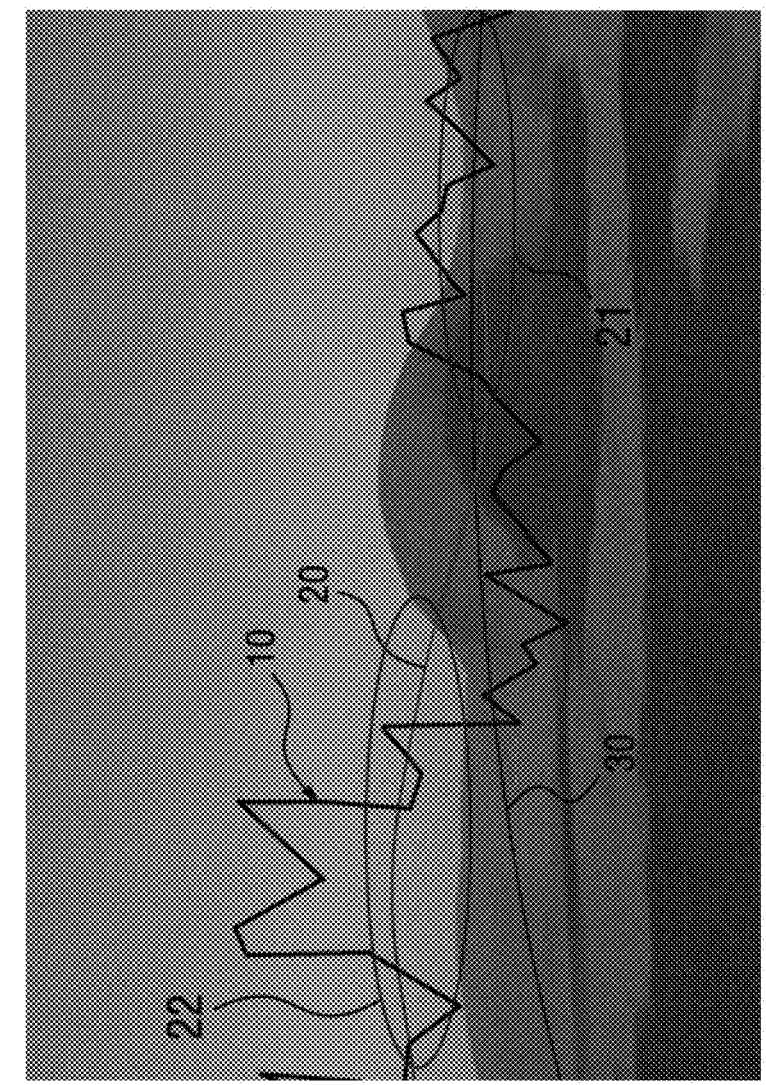

FIG. 13 shows an example of a line 10 connecting the ball position coordinates, a trajectory 20 according to trend data, and a predicted ball trajectory 30 selected from among various predicted ball trajectories.

Wherein the trend data on the trajectory 20 according to the trend data each has weight information as described above.

In FIG. 13, it is assumed that the front portion 22 of the trajectory 20 according to the trend data is trend data having relatively low weight and the rear portion 21 is trend data having relatively high weight.

When the present invention compares each of the various generated predicted ball trajectories and the trajectory according to the trend data (that is, compares the trend points on the trajectory according to the trend data and the coordinate points on the predicted ball trajectory corresponding to the trend data, respectively), the trend data on the high-weighted part 21 and the coordinate points on the corresponding predicted ball trajectory are compared first, or only the part (part 21) is compared and part 22 (low-weighted part) may not compare.

That is, only the trend data having a high weight can be compared with corresponding coordinate points on the predicted ball trajectory to calculate an error and select a predicted ball trajectory with the smallest error.

In other words, an error between the trend data and the coordinate points on the predicted ball trajectory corresponding to each other may be calculated by comparing from the highest weight set to the lowest weight set order among the trend data, or an error between the corresponding trend data and the coordinate points on the predicted ball trajectory can be calculated by comparing data having a higher weight than a predetermined reference among the trend data. The predicted ball trajectory when the calculated error is the lowest among the generated predicted ball trajectories can be determined as the closest or the most matching trajectory.

Among the trend data, comparison priorities are given to data whose 'set weight' is higher than a predetermined criterion, and an error between each trend data and coordinate points on the predicted ball trajectory corresponding to each other is calculated according to the priorities, and the predicted ball trajectory when the calculated error is the lowest among the generated predicted ball trajectories can be determined as the closest or the most matching trajectory.

Alternatively, for example, the error for each of the coordinate data on the trend data (trend data with high weight) corresponding to part 21 in FIG. 13 and the coordinate points on the predicted ball trajectory corresponding thereto is calculated and importance of the calculated error is applied as 100% (the weight of the error means a weight for determining the degree of conformity), and the error for each of the trend data (trend data with low weight) corresponding to part 22 and the coordinate points on the predicted ball trajectory corresponding thereto is calculated and importance of the calculated error is applied as 50%. In such way, it is possible to determine whether the predicted ball trajectory is close to the real trajectory of the ball by more importantly reflecting the comparison result of data with high weight.

As described above, since a weight according to data reliability is set for each of the trend data and high-weighted data is compared with coordinate points on the predicted ball trajectory, the accurate predicted ball trajectory can be quickly determined.

Wherein, when the error calculated by comparing the trend data and the coordinate points on the predicted ball trajectory is the lowest, it can be said that the absolute sum of the calculated errors is obtained and the absolute sum is the smallest.

For example, when 20 errors are calculated between the trend data and the coordinate points on the predicted ball trajectory, the absolute sum of the errors is calculated and it can be determined the predicted ball trajectory with the smallest sum of the errors as the predicted ball trajectory with the lowest error.

In addition to the absolute sum of the errors, the average or representative values of the magnitude values of the errors, standard deviation or variance can also be used as a reference.

Figure 14:
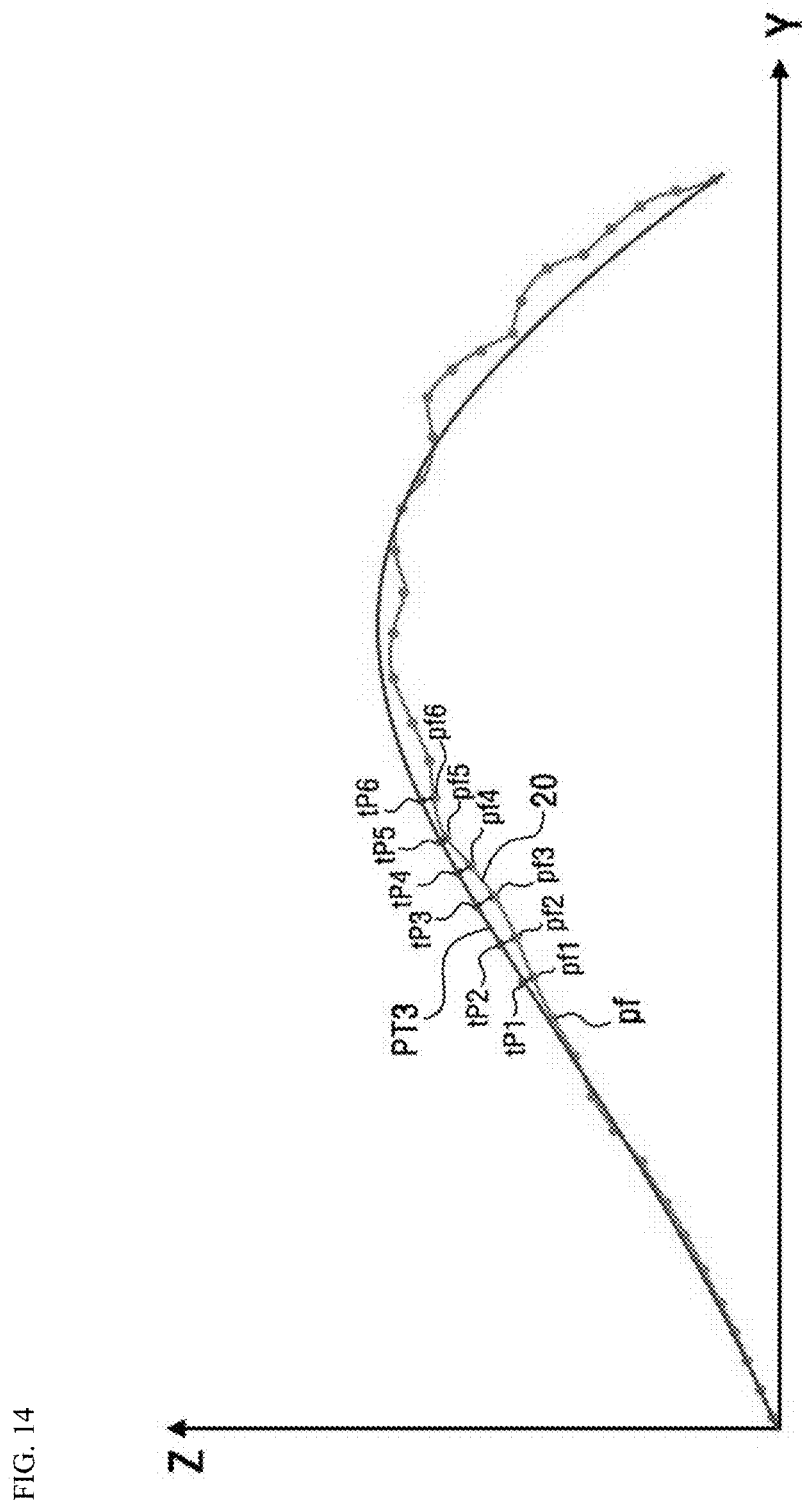

In FIG. 12, trajectories 20 according to trend data and PT1, PT2 and PT3 as predicted ball trajectories to be compared with the trajectory 20 are generated, and an example of comparing trajectories 20 according to the trend data and PT3 trajectory is shown in FIG. 14.

In FIG. 14, if the data having the highest weight among the trend data pf on the trajectory 20 according to the trend data are referred to as pf1, pf2, pf3, pf4, pf5, and pf6, and the coordinates on the predicted ball trajectory PT3 corresponding to the above stated data are referred to as tP1, tP2, tP3, tP4, tP5 and tP6, when comparing the trajectory 20 according to the trend data and the predicted ball trajectory PT3, pf1-tP1, pf2-tP2, pf3-tP3, pf4-tP4, pf5-tP5 and pf6-tP6 are respectively compared, and respective errors are calculated accordingly, and a predicted ball trajectory can be determined using the calculated errors.

If each of the generated prediction ball trajectories has the same or almost indeterminate error between the above-described data, among the trend data, error information calculated through comparison of data having a slightly lower weight and coordinate points on the corresponding predicted ball trajectory is additionally used.

In FIG. 9, after determining the most suitable predicted ball trajectory among the multiple predicted ball trajectories in step S430, a plurality of intervals are generated by further subdividing the interval in which the value of the trial spin information applied to the determined predicted ball trajectory is the representative value, and the representative value for each of the generated subdivided intervals is selected as new trial spin information in step of S460.

And, as described above, when the trial spin information is selected in each of the subdivided intervals, the predicted ball trajectories according to the selected trial spin information can be respectively generated using parameters such as drag, lift, anti-torque and gravity in the initial motion conditions of the ball described above in step of S470.

The above-described step S430 is applied to the predicted ball trajectories respectively calculated according to the plurality of trial spin information selected in the subdivided trial spin interval, and the predicted ball trajectory that best matches the trajectory according to the trend data is determined again considering the weight of the predicted ball trajectories.

When the most suitable predicted ball trajectory is determined in this way, the interval with the representative value of the trial spin applied to the predicted ball trajectory is divided into smaller units, that is, further subdivided to generate a plurality of intervals and a representative value of each interval for each of the generated subdivided intervals may be selected as new trial spin information, and such a process may be repeatedly performed a predetermined number of times.

The process of extracting a plurality of trial spin information as described above, generating predicted ball trajectories according to each trial spin information, and determining the most suitable predicted ball trajectory may be repeated one or more times, the more iterations, the more accurate spin information can be calculated, but it may take an excessive amount of time to calculate the final spin information, on the other hand, if the number of iterations is too small, inaccurate spin information can be calculated. Thus, it is desirable to make the repetition a suitable number of times.

When the determination of the most suitable predicted ball trajectory is made in step S430, the sensing device determines how many times the determination of the most suitable predicted ball trajectory has been repeated, that is, whether the repeated number of times reach a predetermined number of times in step of S440, if the repetition reaches the predetermined number of times, the trial spin information applied to the determined predicted ball trajectory can be determined as the final spin information in step of S450.

Figure 15:
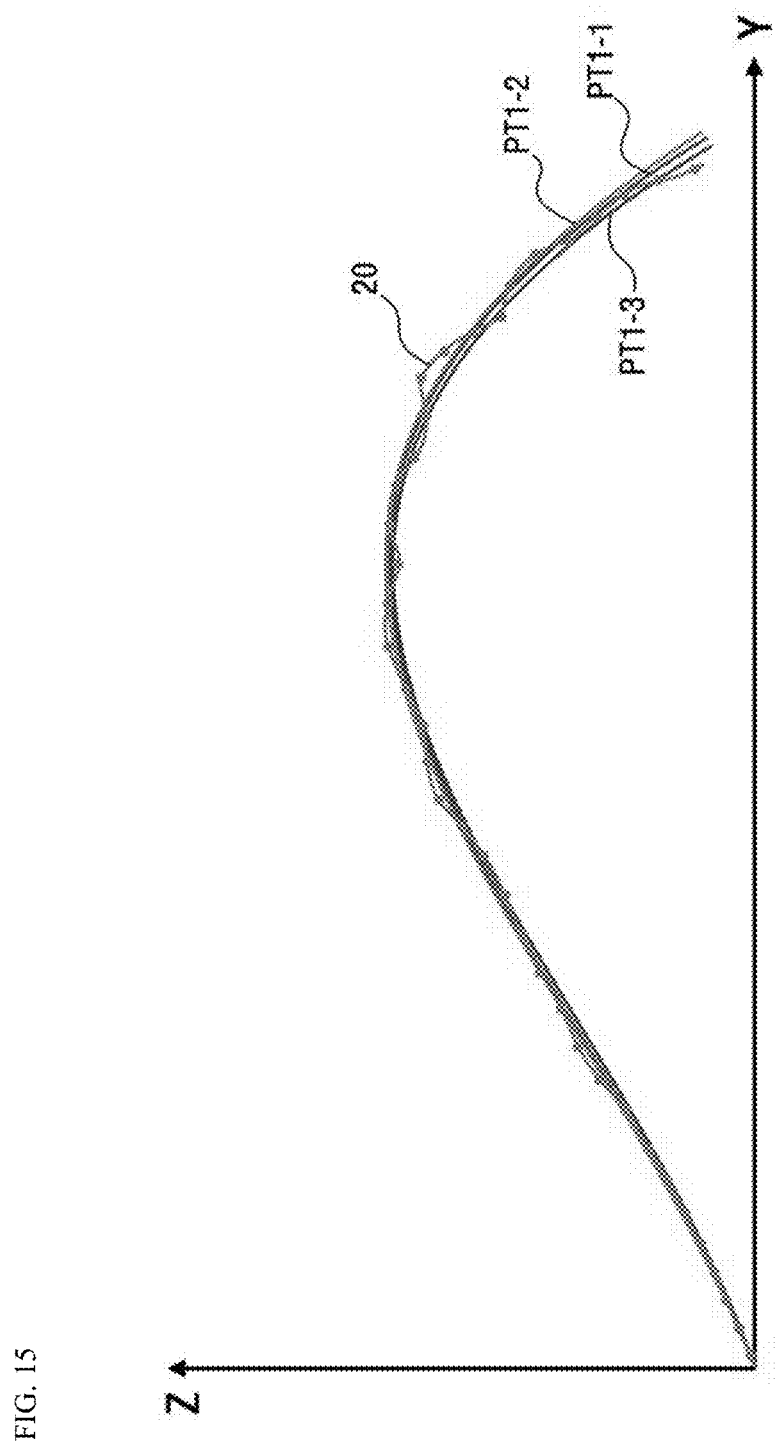

In FIG. 15, if the PT1 trajectory is determined as the most suitable predicted ball trajectory among the plurality of predicted ball trajectories PT1, PT2, and PT3 as shown in FIG. 12, and the process of generating and determining the predicted ball trajectory has not been repeated the predetermined number of times, the sensing device according to an embodiment of the present invention generates a trial spin interval that is more subdivided than before using the determined spin information S1 applied to the determined PT1 predicted ball trajectory.

If the spin information of S1-1, S1-2, and S1-3 are extracted again from the generated trial spin interval, that is, the interval based on the S1 spin information, respectively, the predicted ball trajectory PT1-1 corresponding to the S1-1, the predicted ball trajectory PT1-2 corresponding to the S1-2, and the predicted ball trajectory PT1-3 corresponding to the S1-3 can be generated under the 'initial motion condition of the ball' as shown in FIG. 15.

It is understood from the drawing that the predicted ball trajectories PT1-1, PT1-2, and PT1-3 shown in FIG. 15 are more subdivided than the predicted ball trajectories PT1, PT2, and PT3 shown in FIG. 12.

Figure 16:
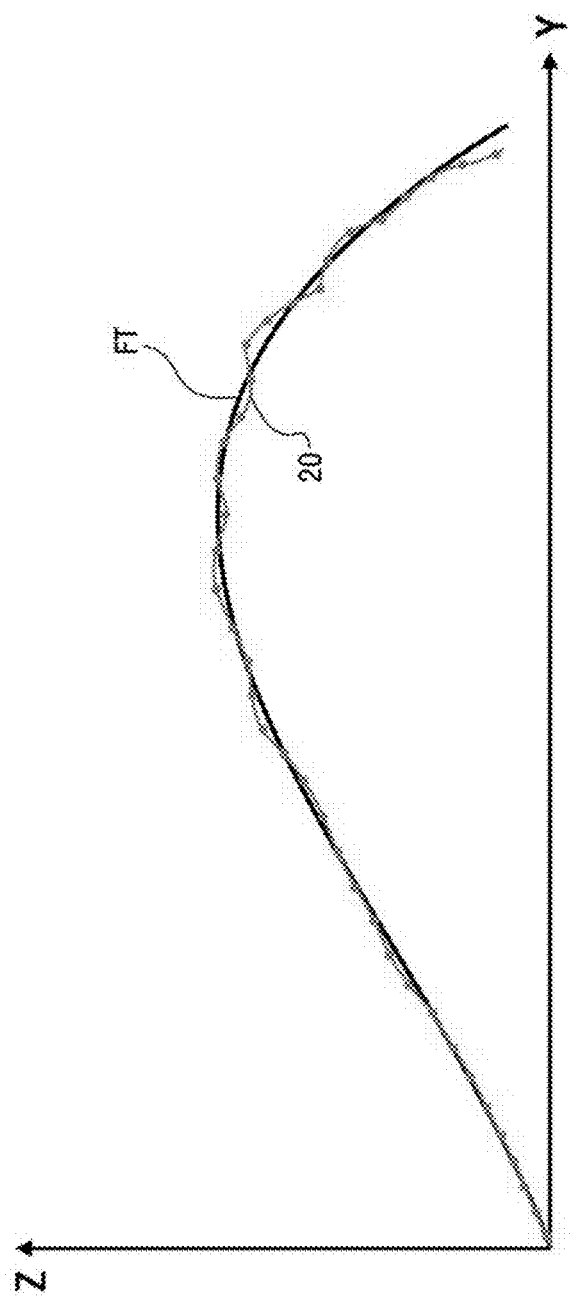

FIG. 16 shows that the predicted ball trajectory is finally determined as the ball trajectory FT, by repeatedly determining the most suitable predicted ball trajectory while gradually subdividing the trial spin interval in this manner.

The trial spin information applied to the finally determined ball trajectory FT is spin information determined as final spin information.

As described above, the sensing device for the moving ball and the method for calculating motion parameters for the ball using the same according to the present invention is not a method of directly calculating the rotational characteristics of a ball through frequency analysis of a received signals as in the prior art, but the final spin information is determined by finding the spin information of the ball while a predicted ball trajectory predicted in terms of the trajectory of the moving ball approaches the trend data indicating the trend for the position coordinate, since it is a method of finding the spin in terms of the ball trajectory, it has the advantage of being able to derive a fairly accurate and uniform spin calculation.

INDUSTRIAL APPLICABILITY

The sensing device for the moving ball and the method for calculating motion parameters for the ball using the same according to the present invention is possible to use in golf-related industrial fields and screen golf industry in which a ball trajectory according to the golf swing and an analysis of golf shot are implemented.

The invention claimed is:

1. A method for calculating motion parameters of the moving ball by transmitting radar signals and receiving and analyzing reflected signals reflected from the moving ball, the method comprising:
   analyzing the received reflected signals and calculating position coordinates data of the moving ball at predetermined time intervals;
   calculating initial motion conditions of the ball using the calculated position coordinates data of the ball;
   generating predicted ball trajectories according to trial spin information under the initial motion conditions of the calculated ball;
   determining a trajectory that best matches the trajectory according to data calculated as a trend of the calculated position coordinates of the ball among the predicted ball trajectories; and
   determining a trial spin information applied to the determined trajectory as a final spin information.

2. The method according to claim 1, wherein the calculating the initial motion conditions of the ball comprises:
   calculating a ball speed using the calculated position coordinates of the ball and a time interval;
   determining flight characteristics of the moving ball and setting an initial confidence interval as a confidence interval of data for accurate calculation of the initial motion conditions of the ball based on the determined flight characteristics; and
   establishing the ball speed, azimuth, and direction angle of the ball as the initial motion conditions of the ball by calculating the azimuth and the direction angle using the coordinates in the set initial confidence interval.

3. The method according to claim 2, wherein the setting the initial confidence interval comprises:
   estimating the azimuth and the direction angle of the ball using a preset number of initial ball position coordinates and calculating an expected ball trajectory using the ball speed and the estimated azimuth and direction angle;
   specifying flight characteristics of the ball based on the calculated expected ball trajectory among various predefined flight characteristics;
   setting an interval determined by an interval determining function corresponding to the specified flight characteristics of the ball as the initial confidence interval.

4. The method according to claim 1, wherein the calculating the initial motion conditions of the ball comprises:
   determining flight characteristics of the moving ball and setting an initial confidence interval as a confidence interval of data for accurate calculation of the initial motion conditions of the ball based on the determined flight characteristics;
   calculating a trajectory in an interval using coordinates in the set initial confidence interval;
   calculating a ball speed, an azimuth and a direction angle of the ball based on the calculated trajectory in the interval, and determining the calculated ball speed, the azimuth and the direction angle as the initial motion conditions of the ball.

5. The method according to claim 1, wherein the determining as the final spin information comprises:
   calculating trend data as data representing a trend of the position coordinates of the ball through at least one of preset signal processing and statistical analysis for each of the coordinates calculated in the step of calculating the position coordinate data of the ball; and determining a trial spin information applied to a predicted ball trajectory that best matches a trajectory according to trend data as the final spin information by iterating what determines at least one predicted ball trajectory that is determined to best match the trajectory according to the calculated trend data among the generated predicted ball trajectories gradually narrowing a trial spin interval applied to the generated predicted ball trajectories.

6. The method according to claim 1, wherein the determining as the final spin information comprises:

calculating trend data as data representing a trend of the position coordinates of the ball through at least one of preset signal processing and statistical analysis for each of the coordinates calculated in the step of calculating the position coordinate data of the ball;

setting a weight for each of the trend data based on a difference for each of the trend data by comparing the position coordinates of the ball with the trend data according to the lower difference the higher weight;

comparing the generated predicted ball trajectory and the calculated trend data, in order from a set high weight to a set low weight among the trend data or with respect to the trend data having a set weight higher than a predetermined criterion, so as to calculate an error between each trend data and coordinate points on the predicted ball trajectory corresponding to each other; and determining a predicted ball trajectory when the error is the lowest among the generated predicted ball trajectories and determining trial spin information applied to the determined predicted ball trajectory as the final spin information.

7. The method according to claim 1, wherein the determining as the final spin information comprises:

calculating trend data as data representing a trend of the position coordinates of the ball through at least one of preset signal processing and statistical analysis for each of the coordinates calculated in the step of calculating the position coordinate data of the ball;

setting a weight for each of the trend data based on a difference for each of the trend data by comparing the position coordinates of the ball with the trend data according to the lower difference the higher weight;

comparing the generated predicted ball trajectory and the calculated trend data according to priorities for comparison given to the trend data which have weights higher than a predetermined criterion, so as to calculate an error between each trend data and coordinate points on the predicted ball trajectory corresponding to each other; and determining a predicted ball trajectory when the error is the lowest among the generated predicted ball trajectories and determining trial spin information applied to the determined predicted ball trajectory as the final spin information.

8. The method according to claim 1, wherein the determining as the final spin information comprises:

calculating trend data as data representing a trend of the position coordinates of the ball through at least one of preset signal processing and statistical analysis for each of the coordinates calculated in the step of calculating the position coordinate data of the ball;

setting a weight for each of the trend data based on a difference for each of the trend data by comparing the position coordinates of the ball with the trend data according to the lower difference the higher weight;

comparing the generated predicted ball trajectory and the calculated trend data in an interval predetermined for having high weights of data on a trajectory according to the trend data, in order from a set high weight to a set low weight among the trend data or with respect to the trend data having a set weight higher than a predetermined criterion, so as to calculate an error between each trend data and coordinate points on the predicted ball trajectory corresponding to each other; and determining a predicted ball trajectory when the error is the lowest among the generated predicted ball trajectories and determining trial spin information applied to the determined predicted ball trajectory as the final spin information.

9. The method according to claim 5, wherein the trend data is calculated through a predefined function by analyzing low-pass filtering signals filtered from the received reflected signals and using filtering coordinates calculated corresponding to each of the calculated position coordinates of the ball and coordinates according to a moving average for position coordinates of the ball.

10. The method according to claim 1, wherein the determining as the final spin information comprises:

determining a predicted ball trajectory closest to a trajectory according to the trend of the position coordinates of the ball using an error between each of the generated predicted ball trajectories and the data representing the trend, and determining a subdivided trial spin interval using trial spin information applied to the determined predicted ball trajectory; and iterating predetermined numbers of time generating predicted ball trajectories by applying a plurality of trial spin information selected within the subdivided trial spin interval, determining the predicted ball trajectory closet to the trajectory according to the data representing the trend, and determining a more subdivided trial spin interval using a trial spin information applied to the determined predicted ball trajectory, so as to determine trial spin information applied to the finally determined predicted ball trajectory as the final spin information.

11. The method according to claim 6, wherein the trend data is calculated through a predefined function by analyzing low-pass filtering signals filtered from the received reflected signals and using filtering coordinates calculated corresponding to each of the calculated position coordinates of the ball and coordinates according to a moving average for position coordinates of the ball.

12. The method according to claim 7, wherein the trend data is calculated through a predefined function by analyzing low-pass filtering signals filtered from the received reflected signals and using filtering coordinates calculated corresponding to each of the calculated position coordinates of the ball and coordinates according to a moving average for position coordinates of the ball.

13. The method according to claim 8, wherein the trend data is calculated through a predefined function by analyzing low-pass filtering signals filtered from the received reflected signals and using filtering coordinates calculated corresponding to each of the calculated position coordinates of the ball and coordinates according to a moving average for position coordinates of the ball.

14. A method for calculating motion parameters of the moving ball by transmitting radar signals and receiving and analyzing reflected signals reflected from the moving ball, the method comprising:
- analyzing the received reflected signals and calculating position coordinates data of the moving ball at predetermined time intervals;
- calculating trend data representing a trend for the position coordinates of the ball based on an analysis of low-pass filtering signals for the received reflected signals and an analysis of a moving average for the position coordinates of the ball;
- calculating initial motion conditions of the ball using at least one of the calculated position coordinates data of the ball and the trend data; and
- repeatedly applying a trial spin information to a predicted ball trajectory until the predicted ball trajectory according to a trial spin information closes to a trajectory according to the trend data within the smallest error range, and determining the trial spin information finally applied as the final spin information.

15. A sensing device for a moving ball comprising:
- a signal transmitter configured to transmit radar signal;
- a signal receiver configured to receive reflected signals reflected from the moving ball;
- a signal analyzer configured to analyze the received reflected signals and calculating position coordinates data of the moving ball at predetermined time intervals; and
- an information calculator configured to:
- calculate an initial motion conditions of the moving ball using the calculated position coordinates data of the ball;
- generate predicted ball trajectories according to various values of trial spin information under the calculated initial motion conditions of the moving ball;
- determine a trajectory that best matches the trajectory according to data calculated as a trend of the calculated position coordinates of the ball among the predicted ball trajectories; and
- determine a trial spin information applied to the determined trajectory as a final spin information.

16. The sensing device according to claim 15, wherein the information calculator is configured to:
- calculate a ball speed using the calculated position coordinates of the ball and the time interval;
- set an initial confidence interval as a confidence interval of data for accurate calculation of the initial motion conditions of the ball based on flight characteristics of the moving ball;
- calculate an azimuth and a direction angle of the ball using coordinates in the set initial confidence interval; and
- determine the ball speed, the azimuth and the direction angle of the ball as the initial motion conditions of the ball.

17. The sensing device according to claim 15, further comprising a low-pass filter for filtering low-frequency components of the reflected signals received by the signal receiver,
wherein the signal analyzer is configured to calculate trend data as data representing a trend of the position coordinates of the ball through at least one of preset signal processing and statistical analysis for each of the coordinates calculated in the step of calculating the position coordinate data of the ball, and
the information calculator is configured to determine a trial spin information applied to a predicted ball trajectory that best matches a trajectory according to trend data as the final spin information by iterating what determines at least one predicted ball trajectory that is determined to best match the trajectory according to the calculated trend data among the generated predicted ball trajectories gradually narrowing a trial spin interval applied to the generated predicted ball trajectories.

18. The sensing device according to claim 15, wherein the signal analyzer is configured to calculate trend data as data representing a trend of the position coordinates of the ball through at least one of preset signal processing and statistical analysis using the calculated position coordinates of the ball based on the analysis of the reflected signals, and
the information calculator is configured to:
- set a weight for each of the trend data based on a difference for each of the trend data by comparing the position coordinates of the ball with the trend data according to the lower difference the higher weight;
- compare the generated predicted ball trajectory and the calculated trend data according to priorities for comparison given to the trend data which have weights higher than a predetermined criterion, so as to calculate an error between each trend data and coordinate points on the predicted ball trajectory corresponding to each other; and
- determine a predicted ball trajectory when the error is the lowest among the generated predicted ball trajectories and determining trial spin information applied to the determined predicted ball trajectory as the final spin information.

19. The sensing device according to claim 15, wherein the signal analyzer is configured to calculate trend data as data representing a trend of the position coordinates of the ball through at least one of preset signal processing and statistical analysis using the calculated position coordinates of the ball based on the analysis of the reflected signals, and
the information calculator is configured to:
- set a weight for each of the trend data based on a difference for each of the trend data by comparing the position coordinates of the ball with the trend data according to the lower difference the higher weight;
- compare the generated predicted ball trajectory and the calculated trend data in an interval predetermined for having high weights of data on a trajectory according to the trend data, in order from a set high weight to a set low weight among the trend data or with respect to the trend data having a set weight higher than a predetermined criterion, so as to calculate an error between each trend data and coordinate points on the predicted ball trajectory corresponding to each other; and
- determine a predicted ball trajectory when the error is the lowest among the generated predicted ball trajectories and determining trial spin information applied to the determined predicted ball trajectory as the final spin information.

* * * * *